(12) United States Patent
Inaba et al.

(10) Patent No.: US 7,683,587 B2
(45) Date of Patent: Mar. 23, 2010

(54) GENERATION DEVICE

(75) Inventors: Yutaka Inaba, Numazu (JP); Masanori Nakagawa, Numazu (JP)

(73) Assignee: Kokusan Denki Co., Ltd., Shizuoka (JP)

( * ) Notice: Subject to any disclaimer, the term of this patent is extended or adjusted under 35 U.S.C. 154(b) by 412 days.

(21) Appl. No.: 11/846,700

(22) Filed: Aug. 29, 2007

(65) Prior Publication Data

US 2008/0067981 A1 Mar. 20, 2008

(30) Foreign Application Priority Data

Aug. 30, 2006 (JP) .............................. 2006-233553

(51) Int. Cl.
*H02P 9/44* (2006.01)
*H02M 3/36* (2006.01)

(52) U.S. Cl. .............................. 322/20; 322/28; 363/37

(58) Field of Classification Search ................... 322/20, 322/22, 28, 37, 99; 363/37, 56
See application file for complete search history.

(56) References Cited

U.S. PATENT DOCUMENTS

| 5,418,446 | A | * | 5/1995 | Hallidy ........................ 322/28 |
| 5,663,631 | A | | 9/1997 | Kajiura et al. | |
| 5,739,677 | A | * | 4/1998 | Tsutsui et al. ................. 322/25 |
| 6,049,194 | A | | 4/2000 | Nakagawa et al. | |
| 6,278,194 | B1 | * | 8/2001 | Nakagawa et al. ............ 290/31 |
| 6,278,622 | B1 | * | 8/2001 | Shimazaki et al. ........... 363/37 |
| 6,373,729 | B1 | * | 4/2002 | Shimazaki et al. ........... 363/37 |
| 6,787,931 | B2 | * | 9/2004 | Nakagawa et al. ............ 290/31 |
| 6,940,259 | B2 | * | 9/2005 | Suzuki et al. ................. 322/20 |
| 7,157,885 | B2 | * | 1/2007 | Nakagawa et al. ............ 322/28 |
| 7,253,590 | B2 | * | 8/2007 | Suzuki et al. ................. 322/20 |

* cited by examiner

*Primary Examiner*—Nicholas Ponomarenko
(74) *Attorney, Agent, or Firm*—Pearne & Gordon LLP

(57) ABSTRACT

A generation device, having a magneto generator, in which an AC control voltage is applied from a battery charged with a rectified output of the magneto generator to an armature winding of the generator through an inverter to control a battery voltage to a limit value or less, comprising: fixed point detection means for detecting a fixed point on a waveform of a phase current of the generator; phase current phase detection means for detecting a phase angle of the fixed point in relation to a reference phase; arithmetical operation means for arithmetically operating timing for generating the AC control voltage with reference to the phase of the fixed point; and inverter control means for controlling switch elements of the inverter so as to generate the AC control voltage at the timing arithmetically operated by the arithmetical operation means.

19 Claims, 9 Drawing Sheets

U-PHASE MAGNETIC FLUX φu

U-PHASE NO-LOAD INDUCED VOLTAGE Vuo
Fig. 3C ADVANCE ANGLE 12° 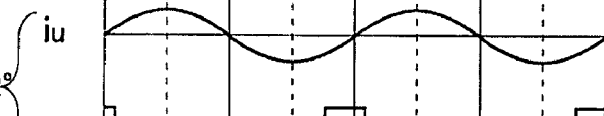
{ iu, Vu }
Fig. 3D ADVANCE ANGLE 0° 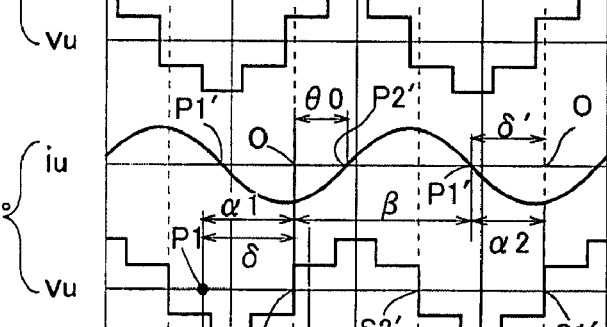
{ iu, Vu }
Fig. 3E DELAY ANGLE 12° 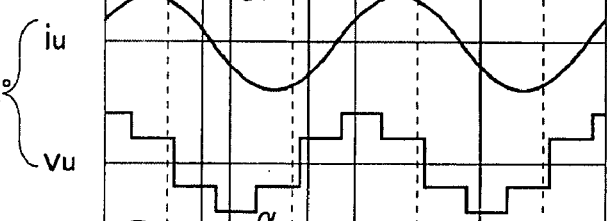
{ iu, Vu }
Fig. 3F DELAY ANGLE 24° 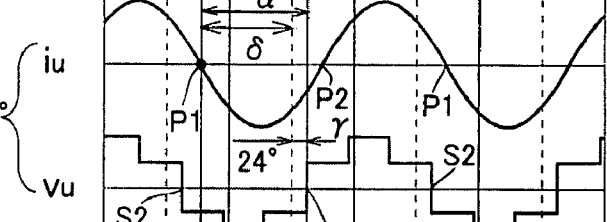
{ iu, Vu }
Fig. 3G RECTIFIER 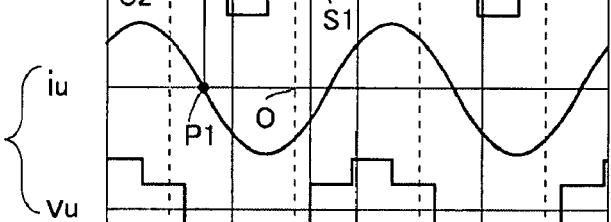
{ iu, Vu }
Fig. 3H DELAY ANGLE 36° 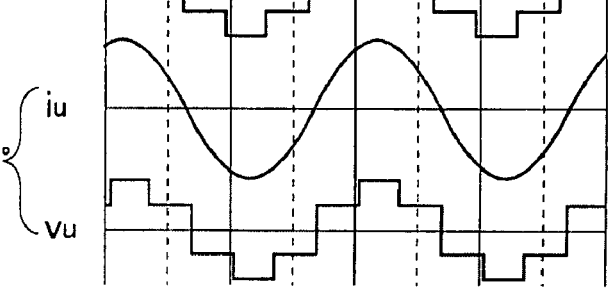
{ iu, Vu }

GENERATION DEVICE

TECHNICAL FIELD OF THE INVENTION

The present invention relates to a generation device that drives a load with a rectified output of a magneto generator.

PRIOR ART OF THE INVENTION

In driving a load with a rectified output of a generator, the output of the generator needs to be controlled so that a voltage across the load does not exceed a limit value for protecting the load from overvoltage. When the generator has a field winding, a current passing through the field winding can be controlled to control the output of the generator. However, in a magneto generator, a field is produced by a permanent magnet, and thus an output of the generator cannot be controlled by controlling the field in the same manner as the generator having the field winding.

Thus, the applicant has proposed a generation device comprising a voltage type inverter between an armature winding of a magneto generator and voltage accumulation means (a battery or a capacitor) connected in parallel with a load, in which an AC control voltage is applied from the voltage accumulation means to the armature winding through the inverter to control a voltage applied across the load so as not to exceed a limit value as disclosed in U.S. Pat. Nos. 6,049,194 and 6,940,259.

In the generation device, an AC voltage induced in the armature winding is applied to the voltage accumulation means through a rectifier circuit comprised of a feedback diode in the inverter to charge the voltage accumulation means, and the AC control voltage is applied from the voltage accumulation means to the armature winding through the inverter to control a phase of the AC control voltage, and thus an output of the magneto generator is controlled so that a voltage across the voltage accumulation means (a voltage across the load of the magneto generator) does not exceed a limit value.

In the magneto generator, if a phase of a magnetic flux waveform showing changes in a magnetic flux interlinking the armature winding or a phase of a no-load induced voltage theoretically calculated from a mechanical construction of the generator is used as a reference phase, and an AC control voltage having the same frequency as the induced voltage of the armature winding and having a phase delayed from the reference phase is applied to the armature winding, the magnetic flux interlinking the armature winding of the magneto generator can be generally increased to increase the output of the generator. If an AC control voltage having a phase advanced from the reference phase is applied to the armature winding, the magnetic flux interlinkng the armature winding can be generally reduced to reduce the output of the generator.

Thus, control can be performed to match the output of the magneto generator with a target value by changing the phase of the AC control voltage to an advance side or a delay side in relation to the reference phase according to whether the voltage across the voltage accumulation means is larger or smaller than the target value.

As described above, the control to adjust the output of the magneto generator by controlling the phase of the AC control voltage in the generation device comprised so that the voltage accumulation means is charged from the armature winding of the magneto generator through the rectifier circuit comprised of the feedback diode in the inverter, and the AC control voltage can be applied from the voltage accumulation means to the armature winding of the magneto generator through the inverter is referred to as "vector control" in a sense that a generation output is controlled by controlling a vector of the AC control voltage applied from the voltage accumulation means to the magneto generator.

When the output of the magneto generator is controlled by the vector control, a phase angle of the AC control voltage applied from the voltage accumulation means to the armature winding through the inverter is decided in relation to the reference phase, and thus information on the reference phase needs to be obtained. Since the reference phase of the AC control voltage is decided by a mechanical construction of the generator, the information on the reference phase can be obtained by detecting that a rotational angle position of a rotor of the generator matches a specific position. Thus, in the generation device described in U.S. Pat. No. 6,049,194, a magnetic sensor that detects a magnetic pole of a permanent magnet that produces a magnetic field of a rotor is provided on a stator as a position sensor that detects that a rotational angle position of the rotor of the generator matches a specific position, and information on the reference phase is obtained from an output of the magnetic sensor.

In the generation device disclosed in U.S. Pat. No. 6,940,259, a pulse signal generator that generates a pulse signal when a rotational angle position of a magneto generator matches a predetermined rotational angle position is provided as the position sensor, and information on the reference phase is obtained from an output pulse of the pulse signal generator. The pulse signal generator is the same as that used for obtaining information on a rotational angle position of an engine in control of ignition timing or the like of the engine using a microprocessor.

U.S. Pat. No. 5,663,631 discloses a generation device using a synchronous generator having a field coil on a rotor, in which an AC control voltage having a phase delayed in relation to a reference phase is applied to an armature winding to increase a generation output. Also in this generation device, a magnetic sensor that detects a magnetic pole of the rotor is provided on a stator as a position sensor that detects a rotational angle position of the rotor, and information on the reference phase is obtained from an output of the magnetic sensor.

As described above, in the conventional generation device using the vector control, the position sensor such as the magnetic sensor or the pulse signal generator needs to be provided for detecting the reference phase of the AC control voltage, which inevitably increases costs.

Generally, a hall element is used as the magnetic sensor, but the hall element is heat-sensitive and hard to adopt in the case where a prime motor such as an engine that causes much heat generation is used as a drive source of a magneto generator.

A generally used pulse signal generator comprises a reluctor comprised of a protrusion or a recess formed in part of a rotor yoke of a generator, and a signal armature that generates a pulse when detecting an edge of the reluctor. In use of an engine as a prime motor, a similar pulse signal generator is used for generating a pulse used for obtaining rotation information of the engine in control of ignition timing or a fuel injection amount of the engine. Thus, when the above described pulse signal generator is used for detecting a reference phase of an AC control voltage, both a reluctor for generating a pulse used for detecting the reference phase of the AC control voltage and a reluctor for generating a pulse used for controlling ignition timing need to be provided in the rotor yoke of the magneto generator. If many reluctors are thus provided in the rotor yoke of the generator, machining of the rotor yoke becomes troublesome, and the reluctors may interfere with each other to generate an error signal, which is unpreferable.

SUMMARY OF THE INVENTION

An object of the present invention is to omit a sensor for detecting a reference phase of an AC control voltage in a generation device in which an inverter is provided between a magneto generator and voltage accumulation means connected in parallel with a load, an output of the magneto generator is rectified by a feedback diode in an inverter and supplied to the voltage accumulation means to charge the voltage accumulation means, the AC control voltage is applied from the voltage accumulation means to an armature winding through the inverter, and a phase of the AC control voltage is controlled to perform control to maintain a voltage across the voltage accumulation means at a limit value or less.

The present invention is directed to a generation device comprising: a magneto generator including a rotor having a magnetic field and a stator having an n-phase (n is an integer equal to or larger than one) armature winding; an n-phase voltage type inverter including n-phase bridge-connected switch elements and feedback diodes connected in anti-parallel with the switch elements, and having an AC terminal connected to an output terminal of the armature winding and DC terminals between which voltage accumulation means and a load are connected in parallel; and a controller that controls the inverter so as to apply an n-phase AC control voltage having the same output voltage and frequency as the magneto generator and having a predetermined phase angle in relation to a preset reference phase from the voltage accumulation means to the armature winding through the inverter to perform control to maintain a voltage across the voltage accumulation means at a limit value or less.

In the present invention, a current detector that detects a phase current of the magneto generator is provided, and timing for generating the AC control voltage is decided with reference to a phase of a fixed point (a zero cross point or a peak point) on a waveform of the phase current detected by the current detector. Thus, the controller comprises: fixed point detection means for detecting a fixed point on a waveform of the phase current detected by the current detector; phase current phase detection means for detecting a phase angle of the fixed point on the waveform of the phase current detected by the fixed point detection means in relation to the reference phase; control voltage generation timing arithmetical operation means for arithmetically operating timing for generating the AC control voltage with reference to the phase of the fixed point on the waveform of the phase current detected by the phase current phase detection means; and inverter control means for controlling the switch elements of the inverter so as to generate the AC control voltage at the timing arithmetically operated by the control voltage generation timing arithmetical operation means.

In the above described magneto generator, it is supposed that the phase angle of the AC control voltage is set so as to pass a phase current having the same level as a phase current that passes when no AC control voltage is applied to the armature winding at a constant rotational speed. The state where the AC control voltage having such a phase angle is applied to the armature winding is the same as the state where the switch elements connected in anti-parallel with the diodes are on during the same time period as a time period for which a current passes from the armature winding through the diodes that constitute the rectifier circuit. Thus, the level of the phase current passing through the armature winding, the phase of the phase current, and the phase of the voltage applied across each phase winding of the armature winding (the phase of the AC control voltage) when the AC control voltage having the phase angle set as described above is applied to the armature winding are the same as the level of the phase current passing through the armature winding, the phase of the phase current, and the phase of the voltage applied across each phase winding of the armature winding when no AC control voltage is applied to the armature winding (a circuit between the magneto generator and the voltage accumulation means merely functions as a rectifier circuit).

The phase angle of the AC control voltage to be applied to the armature winding for passing the phase current having the same level as the phase current that passes when no AC control voltage is applied to the armature winding, and the circuit between the armature winding and the voltage accumulation means merely functions as the rectifier circuit (hereinafter, this state is referred to as non-control time) differs depending on the level of the phase current and the rotational speed, and becomes constant if the level of the phase current and the rotational speed are decided. Thus, there is a certain relationship between the phase angle of the AC control voltage to be applied to the armature winding for passing the phase current having the same level as the phase current that passes in the non-control time, the level of the phase current, and the rotational speed, and this relationship can be used to calculate a phase angle (hereinafter also referred to as a non-control time corresponding phase angle) of the AC control voltage (the voltage across a phase winding) to be applied to the armature winding for passing the phase current having the same level as the phase current that passes in the non-control time from the level of the phase current and the rotational speed.

If an impedance of the armature winding and an impedance of the voltage accumulation means are constant, the phase angle of the voltage across each phase winding of the armature winding to which the AC control voltage is applied and the phase angle of the phase current have a certain relationship, and thus a phase angle of the phase current at the time can be estimated if the phase angle of the AC control voltage is found. Thus, if the voltage across the voltage accumulation means (decided by the level of the phase current and an internal impedance of the voltage accumulation means) is set to a constant value, and the impedance of the armature winding is set to be constant, a phase current phase arithmetical operation map that provides a relationship between the rotational speed, the level of the phase current, and the phase of the phase current can be prepared. The map can be searched with respect to the detected rotational speed and the level of the phase current without the AC control voltage being applied to the armature winding to calculate a phase angle of the fixed point on the waveform of the phase current in relation to the reference phase.

The phase of the phase current in relation to the reference phase thus calculated is arithmetically operated by using the map prepared on the assumption that the voltage across the voltage accumulation means is constant and the impedance of the armature winding is constant, and thus changes if the voltage across the voltage accumulation means changes (the impedance of the voltage accumulation means changes) and internal resistance changes with temperature of the armature winding (the impedance of the armature winding changes). Thus, the phase of the phase current calculated by the map arithmetical operation is preferably corrected with respect to the voltage across the voltage accumulation means and the temperature of the armature winding.

In order to specify the phase of the phase current, the phase angle of the fixed point on the waveform of the phase current in relation to the reference phase needs to be calculated. The fixed point on the waveform of the phase current may be a specific point that can be identified from other points on the waveform of the phase current. The fixed point on the waveform may be a zero cross point in shift of the phase current waveform from a positive half wave to a negative half wave, a zero cross point in shift of the phase current waveform from the negative half wave to the positive half wave, a peak point of the positive half wave or the negative half wave of the phase current waveform, or a point where the positive half wave or the negative half wave of the phase current reaches a set threshold value.

The reference phase may be a phase that does not change with the armature current, and generally, a phase of a no-load induced voltage waveform of the armature winding decided by a construction of the generator, or a phase of a magnetic flux waveform showing changes in magnetic flux interlinking the armature winding of each phase is used as a reference phase.

The phase current phase arithmetical operation map is prepared so as to arithmetically operate the phase angle of the fixed point on the waveform of the phase current in relation to the reference phase, in relation to the rotational speed and the level of the phase current.

In the present invention, basically, timing for generating the AC control voltage required for maintaining the voltage across the voltage accumulation means at the limit value or less is calculated with reference to the phase of the fixed point on the waveform of the phase current thus calculated, and the inverter is controlled so as to apply the AC control voltage to the armature winding at the calculated timing.

The level of the phase current of the armature winding and the fixed point on the waveform of the phase current can be detected by a zero cross detection circuit or the like from the output of the current detector that detects the phase current. The rotational speed of the generator can be arithmetically operated from a cycle of detection of the fixed point on the waveform of the phase current. Thus, as described above, the phase angle of the fixed point on the waveform of the phase current of the magneto generator in relation to the reference phase is calculated, and the timing for generating the AC control voltage is decided with reference to the phase of the fixed point on the waveform of the phase current, and thus the AC control voltage can be generated without using a position sensor for detecting a rotational angle position of the rotor to control the output of the generator, thereby allowing the position sensor such as a magnetic sensor and a pulse signal generator to be omitted and reducing costs.

As described above, the phase of the fixed point on the waveform of the phase current changes with the voltage across the voltage accumulation means and internal resistance of the armature winding. Thus, in a preferred aspect of the present invention, a voltage detector that detects the voltage across the voltage accumulation means and a temperature sensor that detects a temperature of the armature winding of the magneto generator are further provided, and the phase current phase detection means comprises: rotational speed arithmetical operation means for arithmetically operating a rotational speed of the magneto generator from a cycle of detection of the fixed point on the waveform of the phase current by the fixed point detection means; phase current phase arithmetical operation means for searching a phase current phase arithmetical operation map that provides a relationship between the level of the phase current, the rotational speed of the magneto generator, and the phase angle: of the fixed point on the waveform of the phase current in relation to the reference phase, with respect to the level of the phase current detected by the current detector and the rotational speed arithmetically operated by the rotational speed arithmetical operation means to arithmetically operate the phase angle of the fixed point on the waveform of the phase current in relation to the reference phase; and phase current phase correction means for correcting the phase angle arithmetically operated by the phase current phase arithmetical operation means with respect to the voltage across the voltage accumulation means detected by the voltage detector and the temperature of the armature winding detected by the temperature sensor.

The phase current phase arithmetical operation map can be prepared by using the relationship between the phase angle of the AC control voltage to be applied to the armature winding for passing the phase current having the same level as the phase current that passes through the armature winding without the AC control voltage being applied to the armature winding, the rotational speed of the magneto generator, and the level of the phase current, and the relationship between the phase angle of the voltage across each phase winding of the armature winding to which the AC control voltage is applied and the phase angle of the phase current.

In another preferred aspect of the present invention, the controller comprises: fixed point detection means for detecting a fixed point on a waveform of the phase current that appears every lapse of a time period corresponding to a half cycle of the waveform of the phase current; rotational speed arithmetical operation means for arithmetically operating a rotational speed of the magneto generator from a cycle of detection of the fixed point by the fixed point detection means; first phase current phase arithmetical operation means for using one of two fixed points detected in a time period corresponding to one cycle of the waveform of the phase current as a specific fixed point, and arithmetically operating a phase angle of the specific fixed point in relation to the reference phase, with respect to the rotational speed arithmetically operated by the rotational speed arithmetical operation means and the level of the phase current detected by the current detector; first phase current phase correction means for correcting the phase angle arithmetically operated by the first phase current phase arithmetical operation means with respect to the voltage across the voltage accumulation means detected by the voltage detector and the temperature of the armature winding detected by the temperature sensor; first control voltage generation timing arithmetical operation means for arithmetically operating timing for generating the AC control voltage with reference to the phase of the specific fixed point on the waveform of the phase current corrected by the first phase current phase correction means; second phase current phase detection means for detecting the phase of the specific fixed point on the waveform of the phase current that appears after the generation timing of the AC control voltage with reference to the generation timing of the AC control voltage; second phase current phase correction means for correcting the phase of the phase current detected by the second phase current phase detection means with respect to the rotational speed arithmetically operated by the rotational speed arithmetical operation means, the voltage detected by the voltage detector, and the temperature detected by the temperature sensor; second control voltage generation timing arithmetical operation means for arithmetically operating the generation timing of the AC control voltage with reference to the phase of the phase current corrected by the second phase current phase correction means; and inverter control means for controlling the switch elements of the inverter so as to generate the AC control voltage at the timing arithmetically operated by the first control voltage generation timing arithmetical operation means when the AC control voltage is first generated after the voltage across the voltage accumulation means exceeds the limit value, and generate the AC control voltage at the timing arithmetically operated by the second control voltage generation timing arithmetical operation means when the AC control voltage is generated for the second time or thereafter after the voltage across the voltage accumulation means exceeds the limit value.

Comprised as described above, the generation timing of the AC control voltage applied to the armature winding for the second time or thereafter after the output voltage exceeds the limit value with the AC control voltage being applied can be calculated to generate the AC control voltage.

In the above described construction, there are provided the second phase current phase detection means for detecting the phase of the specific fixed point on the waveform of the phase current that appears after the generation timing of the AC control voltage with reference to the generation timing of the AC control voltage, and the second phase current phase correction means for correcting the phase of the phase current detected by the second phase current phase detection means with respect to the rotational speed arithmetically operated by the rotational speed arithmetical operation means, the voltage detected by the voltage detector, and the temperature detected by the temperature sensor, and the second control voltage generation timing arithmetical operation means is comprised so as to arithmetically operate the generation timing of the AC control voltage generated for the second time or thereafter with reference to the phase of the phase current corrected by the second phase current phase correction means. However, the second phase current phase detection means and the second phase current phase correction means may be omitted, and the second control voltage generation timing arithmetical operation means may be comprised so as to arithmetically operate generation timing of a next generated AC control voltage with reference to the generation timing of the AC control voltage.

The phase current phase detection means may be comprised so as to detect a phase of a fixed point on a waveform of a phase current of one of n phases, or detect a phase of a fixed point on a waveform of a phase current of each of the n phases. In the case where the phase current phase detection means is comprised so as to detect the phase of the fixed point on the waveform of the phase current of one phase only, the control voltage generation timing arithmetical operation means is comprised so as to calculate generation timing of an n-phase AC control voltage with reference to the phase of the fixed point on the waveform of the phase current of one phase.

In the case where the phase current phase detection means is comprised so as to detect the phase of the fixed point on the waveform of the phase current of each of the n phases, the control voltage generation timing arithmetical operation means is comprised so as to calculate generation timing of the AC control voltage of each phase with reference to the phase of the fixed point on the waveform of the phase current of each phase detected by the phase detection means.

In the above description, the phase of the fixed point on the waveform of the phase current of the magneto generator is arithmetically operated with respect to the rotational speed and the level of the phase current, and the timing for generating the AC control voltage is decided with reference to the phase of the fixed point on the waveform of the phase current. However, it may be allowed that the voltage across each phase winding of the magneto generator is detected as a phase voltage, a phase of a fixed point on a waveform of the phase voltage is arithmetically operated with respect to a rotational speed and the level of a phase current, and timing for generating the AC control voltage is decided with reference to the phase of the fixed point on the waveform of the arithmetically operated phase voltage.

In this case, the controller may comprise: fixed point detection means for detecting a fixed point on a waveform of a phase voltage; rotational speed arithmetical operation means for arithmetically operating a rotational speed of the magneto generator from a cycle of detection of the fixed point on the waveform of the phase voltage by the fixed point detection means; phase voltage phase arithmetical operation means for searching a phase voltage phase arithmetical operation map that provides a relationship between the level of the phase current, the rotational speed of the magneto generator, and a phase angle of the fixed point on the waveform of the phase voltage in relation to the reference phase, with respect to the level of the phase current detected by the current detector and the rotational speed arithmetically operated by the rotational speed arithmetical operation means to arithmetically operate the phase angle of the phase voltage in relation to the reference phase; control voltage generation timing arithmetical operation means for arithmetically operating timing for generating the AC control voltage with reference to the phase of the fixed point of the phase voltage arithmetically operated by the phase voltage phase arithmetical operation means; and inverter control means for controlling the switch elements of the inverter so as to generate the AC control voltage at the timing arithmetically operated by the control voltage generation timing arithmetical operation means.

The phase voltage phase arithmetical operation map can be prepared by using the relationship between the phase angle of the AC control voltage to be applied to the armature winding for passing the phase current having the same level as the phase current that passes through the armature winding without the AC control voltage being applied to the armature winding, the rotational speed of the magneto generator, and the level of the phase current.

The fixed point on the waveform of the phase voltage may be any of a zero cross point in shift of the phase voltage waveform from a positive half wave to a negative half wave, a zero cross point in shift of the phase voltage waveform from the negative half wave to the positive half wave, a peak point of the positive half wave or the negative half wave of the phase voltage waveform, or a point at which the positive half wave or the negative half wave of the phase voltage reaches a set threshold value.

The phase voltage phase detection means may be comprised so as to detect a phase of a fixed point on a waveform of a phase voltage of one phase only, or detect a phase of a phase current of each of n phases. In the case where the phase voltage phase detection means is comprised so as to detect the phase of the fixed point on the waveform of the phase voltage of one phase only, the control voltage generation timing arithmetical operation means is comprised so as to calculate generation timing of an n-phase AC control voltage with reference to the phase of the phase current of one phase. In the case where the phase voltage phase detection means is comprised so as detect the phase of the phase current of each of the n phases, the control voltage generation timing arithmetical operation means is comprised so as to calculate generation timing of the AC control voltage of each phase with reference to the phase of the phase current of each phase detected by the phase voltage phase detection means.

As described above, according to the present invention, the phase of the fixed point on the waveform of the phase current of the magneto generator in relation to the reference phase, or the phase of the fixed point on the waveform of the phase voltage in relation to the reference phase is calculated to decide the timing for generating the AC control voltage with reference to the phase of the fixed point on the waveform of the phase current or the phase of the fixed point on the waveform of the phase voltage. Thus, the AC control voltage can be generated without using the position sensor for detecting the rotational angle position of the rotor to perform control of the output of the generator by vector control. Thus, the position sensor such as a magnetic sensor or a pulse signal generator can be omitted to reduce costs of the generation device.

BRIEF DESCRIPTION OF THE DRAWINGS

The above and other objects and features of the invention will be apparent from the detailed description of the preferred embodiments of the invention, which is described and illustrated with reference to the accompanying drawings, in which.

DETAILED DESCRIPTION OF THE PREFERRED EMBODIMENTS

Now, preferred embodiments of the present invention will be described in detail with reference to the drawings.

Figure 1:
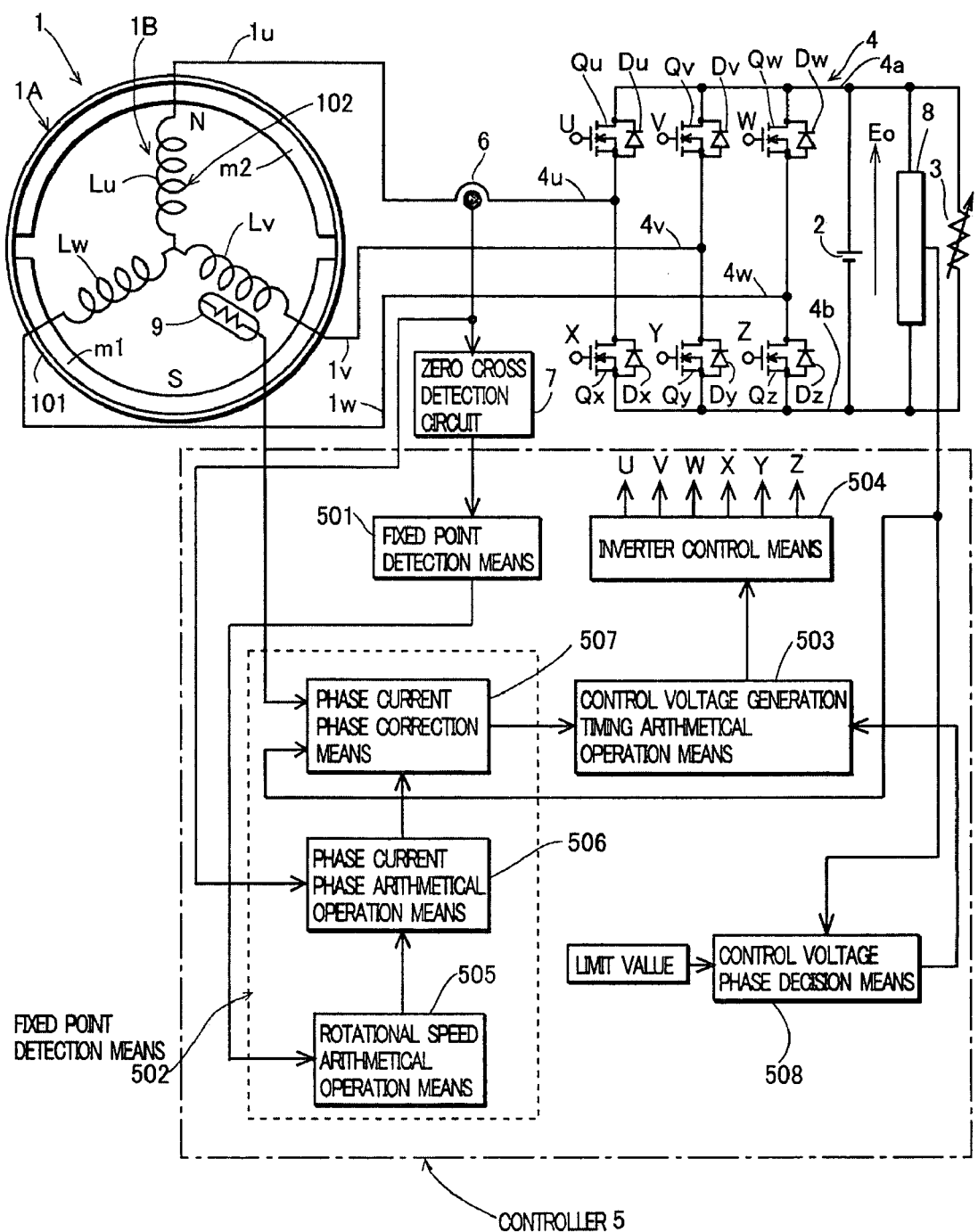
FIG. 1 is a block diagram of a construction of an embodiment of the present invention.

FIG. 1 is a block diagram of a construction of a preferred embodiment of a generation device according to the present invention. In FIG. 1, 1 denotes a magneto generator driven by an engine, 2 denotes a battery as voltage accumulation means, 3 denotes a load connected across the voltage accumulation means 2, 4 denotes an inverter provided between the magneto generator 1 and the voltage accumulation means 2, 5 denotes a controller that controls the inverter, 6 denotes a current detector that detects a phase current of the magneto generator 1, 7 denotes a zero cross detection circuit that detects a zero cross point of the phase current detected by the current detector 6, 8 denotes a voltage detector that detects a voltage across the voltage accumulation means 2, and 9 denotes a temperature sensor that detects a temperature of an armature winding of the magneto generator 1.

More specifically, the magneto generator 1 is comprised of a rotor 1A mounted to a crankshaft of the engine, and a stator 1B secured to a case or the like of the engine. The rotor 1A is comprised of permanent magnets m1 and m2 mounted to an inner periphery of a peripheral wall portion of a cup-shaped rotor yoke 101 made of ferromagnetic material such as iron to produce a magnetic field, and an unshown boss provided at the center of a bottom wall portion of the rotor yoke 101 is mounted to a crankshaft of the engine. The stator 1B is comprised of an armature core (not shown) having a magnetic pole portion facing a magnetic pole of the rotor 1A, and an armature winding 102 wound around the armature core. The armature winding 102 has three phase windings Lu, Lv and Lw star connected, and three-phase output terminals 1u to 1w are led out of ends of the phase windings Lu to Lw opposite to a neutral point.

The inverter 4 is a known three-phase voltage type inverter including switch elements Qu, Qv, Qw, Qx, Qy and Qz three-phase bridge connected, and feedback diodes Du, Dv, Dw, Dx, Dy and Dz connected in anti-parallel with the switch elements. The switch elements that form each side of a bridge of the voltage type inverter 4 may have a self turn-off capability (a capability to turn on when receiving a drive signal while to turn off when the drive signal is removed) such as bipolar transistors, MOSFETs, or IGBTs.

In the shown example, each switch element is comprised of a MOSFET, and a parasitic diode formed between a drain and a source of the MOSSFT that constitutes each switch element is used as a feedback diode. MOSFETs that constitute the switch elements Qu to Qw and Qx to Qz are maintained in an on state when drive signals U, V, W and X, Y, Z are provided to gates thereof, and turned off when the drive signals are removed.

In the shown inverter 4, sources of the MOSFETs that constitutes the switch elements Qu to Qw that form an upper side of the bridge and drains of the MOSFETs that constitute the switch elements Qx to Qz that form a lower side of the bridge are alternately connected, and connection points of the sources of the MOSFETs that constitute the switch elements Qu to Qw and the drains of the MOSFETs that constitute the switch elements Qx to Qz are three-phase AC terminals 4u to 4w, respectively. The drains of the MOSFETs that constitute the switch elements Qu to Qw are commonly connected, the sources of the MOSFETs that constitute the switch elements Qx to Qz are commonly connected, and a common connection point of the drains of the MOSFETs that constitute the switch elements Qu to Qw and a common connection point of the sources of the MOSFETs that constitute the switch elements Qx to Qz are positive and negative DC terminals 4a and 4b, respectively. The three-phase AC terminals 4u to 4w of the inverter 4 are connected to the three-phase output terminals 1u to 1w, respectively, of the armature winding 102 of the magneto generator 1, and the positive and negative DC terminals 4a and 4b are connected to a positive terminal and a negative terminal, respectively, of the battery 2.

In the inverter 4, the switch elements that form the upper side of the bridge and the switch elements that form the lower side of the bridge are controlled to be turned on at predetermined timing during a time period corresponding to 180° of one cycle of the AC voltage. At this time, the inverter 4 converts the voltage across the battery 2 into symmetrical three-phase AC voltages having a step-like waveform with the same frequency as the output of the magneto generator, and the AC voltage Vu is applied to the armature winding 102 as the AC control voltage. Vu in FIG. 3 denotes a waveform of a U-phase AC control voltage of the three-phase AC control voltage.

In the shown inverter 4, a three-phase diode bridge full-wave rectifier circuit is comprised of the feedback diodes Du to Dw and Dx to Dz, the AC output of the magneto generator 1 is rectified by the rectifier circuit and supplied to the battery 2. The feedback diodes are also used for feeding back to the battery 2 reactive power generated by the power factor of the armature winding 102 being not one when the AC control voltage is applied from the battery 2 to the armature winding 102.

The current detector 6 is a sensor that generates an electrical signal proportional to a phase current passing through the armature winding of the magneto generator, and any current sensor comprised of a current transformer, a shunt resistor or the like may be used as the current detector. In the shown example, the current detector 6 is provided so as to detect a current iu passing through the U-phase winding of the armature winding.

An output of the current detector 6 is input to the zero cross detection circuit 7. The zero cross detection circuit 7 may be comprised of, for example, a waveform shaping circuit that converts a waveform of a detected phase current into a rectangular wave, and a differentiating circuit that differentiates leading and trailing edges of the rectangular wave obtained from the waveform shaping circuit and generates pulses.

The voltage detector 8' is comprised of, for example, a resistance voltage divider circuit connected across the battery 2, and outputs an electrical signal proportional to the voltage across the battery 2.

The temperature sensor 9 is provided for detecting a temperature of the armature winding 102. The temperature sensor 9 is comprised of an element that outputs an electrical signal proportional to the detected temperature, for example, a temperature sensing resistance element across which a certain DC voltage is applied. The temperature sensor 9 may be thermally directly connected to the armature winding 102 so as to directly detect the temperature of the armature winding, or the temperature sensor 9 may be thermally connected to a portion to which the temperature of the armature winding is transmitted such as an armature core or a winding bobbin so as to indirectly detect the temperature of the armature winding.

Detection signals obtained from the current detector 6, the zero cross detection circuit 7, the voltage detector 8 and the temperature sensor 9 are input to the controller 5. The controller 5 includes a microprocessor, and the microprocessor executes a predetermined program to construct various means required for controlling the inverter 4.

In the embodiment, generation timing of the AC control voltage is decided with reference to a phase of a fixed point on the waveform of the phase current. In the embodiment, a zero cross point in shift of the phase current waveform from a positive half wave to a negative half wave is used as the fixed point, and the generation timing of the AC control voltage is arithmetically operated with reference to the fixed point. Thus, the shown controller 5 includes fixed point detection means 501 that uses an output signal of the zero cross detection circuit 7 that detects the zero cross point of the phase current detected by the current detector 6 as an input, and detects the zero cross point in shift of the phase current waveform from the positive half wave to the negative half wave as the fixed point. In the specification, a zero cross point in shift of the phase current waveform from the negative half wave to the positive half wave is referred to as a zero-phase zero cross point, and a zero cross point in shift of the phase current waveform from the positive half wave to the negative half wave is referred to as a n-phase zero cross point.

In the embodiment, when the voltage across the battery 2 is a limit value or less, no AC control voltage is applied to the armature winding 102 of the magneto generator, and the AC output generated by the armature winding 102 is rectified through the diode bridge full-wave rectifier circuit comprised of the feedback diodes in the inverter 4 and supplied to the battery 2 to charge the battery 2. When the voltage across the battery 2 exceeds the limit value, an AC control voltage having a predetermined phase angle in relation to a reference phase is applied from the battery 2 to the armature winding 102 through the inverter 4, thereby reducing the output of the magneto generator 1 and reducing the voltage across the battery 2 to the limit value or less.

When the voltage across the battery 2 exceeds the limit value, the phase of the fixed point on the waveform of the phase current in relation to the reference phase is first calculated from the level of the phase current and a rotational speed in the state before application of the AC control voltage, the generation timing of the AC control voltage having a phase angle suitable for reducing the output of the magneto generator is arithmetically operated with reference to the fixed point on the waveform of the phase current, and the inverter 4 is controlled so as to generate a first AC control voltage when the arithmetically operated timing is detected. Then, generation timing of a next generated AG control voltage is arithmetically operated by an appropriate method, and the inverter 4 is repeatedly controlled at the arithmetically operated timing to generate the AC control voltage, and thus the AC control voltage is repeatedly applied to the armature winding 102 to reduce the output of the magneto generator. After the detection that the voltage across the battery exceeds the limit value, the generation timing of the AC control voltage to be applied to the armature winding for the second time or thereafter can be arithmetically operated with reference to, for example, the generation timing of the AC control voltage applied earlier to the armature winding.

As the reference phase used in decision of the phase of the fixed point on the waveform of the phase current and the phase angle of the AC control voltage, a phase of a waveform showing changes in magnetic flux interlinking the armature winding or a phase of a waveform of a no-load induced voltage of the armature winding theoretically calculated from the construction of the magneto generator is used. In the embodiment, the phase of a theoretical no-load induced voltage of the armature winding 102 is used as the reference phase.

In order to perform the above described control, the controller 5 comprises phase current phase detection means 502 for detecting a phase angle of the fixed point on the waveform of the phase current detected by the fixed point detection means 501 in relation to the reference phase, control voltage generation timing arithmetical operation means 503 for arithmetically operating timing for generating the AC control voltage with reference to the phase of the fixed point on the waveform of the phase current detected by the phase current phase detection means 502, and inverter control means 504 for controlling the switch elements of the inverter 4 so as to generate the AC control voltage at the timing arithmetically operated by the control voltage generation timing arithmetical operation means 503.

Figure 2:
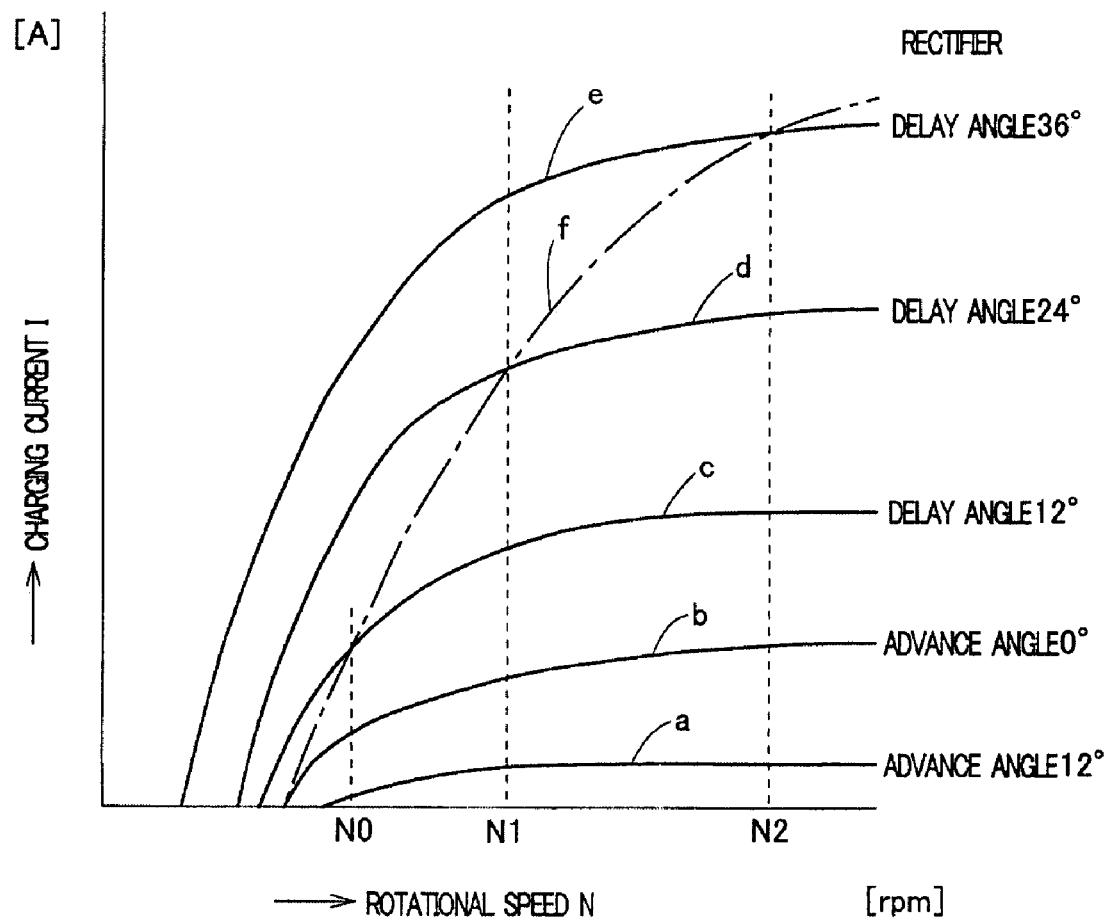
FIG. 2 is a graph showing a charging current to rotational speed characteristic in charging a battery with a rectified output of a magneto generator using a phase angle of an AC control voltage applied to an armature winding as a parameter.

Now, with reference to FIGS. 2 and 3, the reason that the phase angle of the fixed point on the waveform of the phase current in relation to the reference phase can be arithmetically operated from the level of the phase current and the rotational speed will be described. FIG. 2 shows an example of a relationship between a charging current I of the battery 2, a rotational speed N [rpm] of the generator, and the phase angle of the AC control voltage applied from the battery 2 to the armature winding 102 through the inverter 4 in the magneto generator in FIG. 1. In FIG. 2, the curve a shows a charging current to rotational speed characteristic when an advance angle of the AC control voltage in relation to the reference phase is 12°, and the curve b shows a charging current to rotational speed characteristic when the advance angle of the AC control voltage in relation to the reference phase is 0°. The curves c to e show charging current to rotational speed characteristics when delay angles of the AC control voltage in relation to the reference phase are 12°, 24° and 36°, and the curve f shows a charging current to rotational speed characteristic when no AC control voltage is applied, that is, when the output of the magneto generator 1 is merely rectified by a full-wave rectifier and supplied to the battery 2.

In the example in FIG. 2) in a range of the phase angle of the AC control voltage in relation to the reference phase from the delay angle of 36° to the advance angle of 12°, control to reduce the charging current (the phase current of the generator) can be performed by changing the phase angle of the AC control voltage in relation to the reference phase toward the advance angle. On the other hand, control to increase the charging current can be performed by changing the phase of the AC control voltage toward the delay angle.

In FIG. 2, when the rotational speed N is fixed at N1, and the phase angle of the AC control voltage is the delay angle of 24°, the level of the charging current I can be made equal to a charging current I that passes when no AC control voltage is applied. The charging current that passes when no AC control voltage is applied is a charging current that passes when a circuit between the magneto generator and the battery has a mere function of a rectifier that rectifies the output of the magneto generator.

Thus, the phase of the voltage applied across each phase winding of the magneto generator and the phase of the phase current when the rotational speed is N1 and the phase angle of the AC control voltage is the delay angle of 24° are equal to the phase of the voltage applied across each phase winding and the phase of the phase current when no AC control voltage is applied.

Figure 3A:
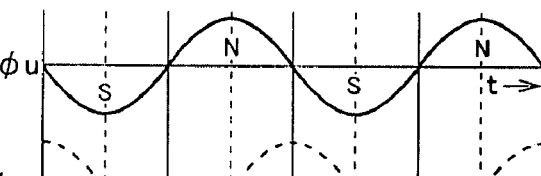
FIG. 3 is a waveform chart showing a waveform of a phase current that passes through a U-phase winding and a waveform of a voltage applied across a phase winding when a rotational speed of the magneto generator is N1 in FIG. 2, with respect to various phase angles of the AC control voltage.
Figure 3B:
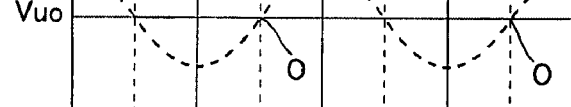

FIG. 3 shows a waveform of the U-phase current iu and the waveform of the AC control voltage Vu applied to the U-phase winding when the rotational speed of the generator is fixed at N1 and the reference phase of the AC control voltage is changed from the advance angle of 12° to the delay angle of 36° and when no AC control voltage is applied (when the circuit between the magneto generator and the battery is merely the rectifier) in the generation device having the characteristics in FIG. 2, together with a waveform of a magnetic flux φu interlinking the U-phase winding and a waveform of a theoretical no-load induced voltage Vuo induced in the U-phase winding. In this example, a zero cross point O in shift of a waveform of the U-phase no-load induced voltage Vuo in FIG. 3(B) from a negative half wave to a positive half wave is used as a reference phase.

As is apparent from FIGS. 3(F) and 3(G), if the phase angle (the delay angle of 24° in the shown example) of the AC control voltage is set so as to pass a phase current having the same level as the phase current iu that passes when no AC control voltage is applied to the armature winding at the rotational speed of N1, the level of the phase current iu that passes through the armature winding, the phase of the phase current, and the phase of the voltage applied across each phase winding of the armature winding (the phase of the AC control voltage) when the AC control voltage is applied to the armature winding are the same as the level of the phase current passing through the armature winding, the phase of the phase current, and the phase of the voltage applied across each phase winding of the armature winding when no AC control voltage is applied to the % armature winding (when the circuit between the magneto generator and the battery is merely a rectifier circuit). In this example, the state where the AC control voltage having the phase angle of the delay angle of 24° in relation to the reference phase (the point O) is applied to the armature winding 102 is the same as the state where the switch elements connected in anti-parallel with the diodes that constitute the rectifier circuit are on during the same time period as a time period for which a current passes from the armature winding 102 through the diodes.

The phase angle (a non-control time corresponding phase angle) of the AC control voltage to be applied to the armature winding for passing the phase current having the same level as the phase current that passes when no AC control voltage is applied to the armature winding (in non-control time) differs depending on the level of the phase current and the rotational speed, and is fixed when the level of the phase current and the rotational speed are decided. For example, in FIG. 2, when the rotational speed is N0 and the phase angle of the AC control voltage is the delay angle of 12°, the phase of the phase current, the level of the phase current, and the phase of the voltage applied to each phase winding are the same even if the AC control voltage is applied or not. Similarly, when the rotational speed is N2, and the phase angle of the AC control voltage is the delay angle of 36°, the phase of the phase current, the level of the phase current, and the phase of the voltage applied to each phase winding are the same even if the AC control voltage is applied or not.

Thus, since there is a certain relationship between the phase angle of the AC control voltage to be applied to the armature winding for passing the phase current having the same level as the phase current that passes in the non-control time, the level of the phase current, and the rotational speed, the relationship can be used to calculate the phase angle of the AC control voltage to be applied to the armature winding for passing the phase current having the same level as the phase current that passes in the non-control time in relation to the reference phase as the non-control time corresponding phase angle from the level of the phase current and the rotational speed.

If an impedance of the armature winding and an internal impedance of the battery are fixed, there is a certain relationship between the phase angle of the AC control voltage of each phase (the voltage applied across each phase winding of the armature winding) calculated as described above in relation to the reference phase, and the phase angle of the fixed point on the waveform of the phase current (the π-phase zero cross point in this example) in relation to the reference phase, and thus the phase angle of the phase current at the time can be estimated if the phase angle of the AC control voltage is found.

For example, in the example in FIG. 3, if it is found that the non-control time corresponding phase angle is the delay angle of 24°, it can be estimated that the phase angle of the fixed point (the point P1) on the waveform of the phase current in relation to the reference phase (the point O) is δ from an advance angle amount of the phase of the phase current predicted from the impedance of the armature winding and the internal impedance of the battery.

Thus, with the voltage across the battery 2 (that changes with the internal impedance of the battery) being fixed, and the impedance of the armature winding 102 being fixed (the temperature of the armature winding being fixed), the relationship between the non-control time corresponding phase angle of the AC control voltage, the rotational speed of the magneto generator, and the level of the phase current, and the relationship between the phase angle of the voltage across each phase winding of the armature winding to which the AC control voltage is applied and the phase angle of the phase current can be used to prepare a phase current phase arithmetical operation map that provides the relationship between the rotational speed N, the level of the phase current iu, and the phase angle $\delta$ of the fixed point (the point P1) on the waveform of the phase current iu in relation to the reference phase (the point O). The phase angle of the fixed point (the point P1 in FIG. 3) on the waveform of the phase current in relation to the reference phase (the point O in FIG. 3) can be calculated by searching the map with respect to the rotational speed and the level of the phase current detected when no AC control voltage is applied to the armature winding 102.

The phase angle of the fixed point on the waveform of the phase current in relation to the reference phase calculated as described above is arithmetically operated by using the map prepared on the assumption that the voltage across the battery is fixed and the impedance of the armature winding is fixed, and thus changes if the voltage across the battery changes (the impedance of the battery changes), internal resistance thereof changes with the temperature of the armature winding, and the impedance of the armature winding changes. Thus, the phase of the fixed point on the waveform of the phase current arithmetically operated by using the phase current phase arithmetical operation map needs to be corrected with respect to the voltage across the battery and the temperature of the armature winding.

In the embodiment, the phase current phase detection means 502 is comprised of rotational speed arithmetical operation means 505 for arithmetically operating the rotational speed of the magneto generator from a cycle of detection of the fixed point (the $\pi$-phase zero cross point in this example) on the waveform of the phase current by the fixed point detection means 501, phase current phase arithmetical operation means 506 for searching the phase current phase arithmetical operation map that provides the relationship between the level of the phase current, the rotational speed of the magneto generator, and the phase angle of the fixed point on the waveform of the phase current in relation to the reference phase, with respect to the level of the phase current detected by the current detector and the rotational speed arithmetically operated by the rotational speed arithmetical operation means 505 to arithmetically operate the phase angle of the fixed point on the waveform of the phase current in relation to the reference phase, and phase current phase correction means 507 for correcting the phase angle arithmetically operated by the phase current phase arithmetical operation means 506 with respect to the voltage across the battery 2 detected by the voltage detector 8 and the temperature of the armature winding 102 detected by the temperature sensor 9.

The correction of the phase angle of the fixed point on the waveform of the phase current by the phase current phase correction means 507 can be performed by, for example, multiplying the phase angle of the phase current arithmetically operated by the phase current phase arithmetical operation means by a correction coefficient arithmetically operated with respect to the voltage value detected by the voltage detector and the temperature detected by the temperature sensor. The arithmetical operation of the correction coefficient can be performed by using a map prepared based on an experiment value. The map used for arithmetically operating correction coefficients with respect to the voltage value and the detection value of the temperature is experimentally prepared.

If the phase angle $\delta$ of the fixed point on the waveform of the phase current iu in relation to the reference phase can be calculated as described above, the timing for detection of the fixed point on the waveform of the phase current is used as reference timing to calculate generation timing of the AC control voltage required to be applied to the armature winding for controlling the output of the generator. For example, a phase angle $\alpha$ with respect to the fixed point P1 of an AC control voltage having a phase angle of $\gamma$ with respect to the reference timing is $\alpha=\delta+\gamma$, and thus time required for rotation through a section of an electrical angle of $\alpha$ at the present rotational speed is arithmetically operated as control voltage generation timing detecting clocking data, and the clocking data can be measured by a timer to detect the generation timing of the AC control voltage. The switch elements of the inverter 4 are turned on/off at predetermined timing so that the three-phase AC control voltage having the frequency decided by the rotational speed of the magneto generator is output from the inverter 4 at the generation timing, thereby allowing the AC control voltage to be applied from the inverter 4 to the armature winding 102.

The controller 5 also comprises control voltage phase decision means 508 for comparing the voltage across the battery (an output voltage) E0 detected by the voltage detector 8 with a limit value EL, and deciding a phase angle $\gamma$ in relation to the reference phase of the AC control voltage required to be applied to the armature winding 102 for reducing the voltage across the battery to the limit value or less when the voltage across the battery exceeds the limit value, and the phase angle decided by the control voltage phase decision means 508 is provided to the control voltage generation timing arithmetical operation means 503.

In order to reduce the output of the generator, the phase of the AC control voltage may be generally changed toward an advance side. The control voltage phase decision means 508 may be comprised so as to advance the phase angle of the AC control voltage in relation to the reference phase stepwise by a predetermined angle with time when the voltage across the battery exceeds the limit value, or so as to arithmetically operate a phase angle (a fixed value that does not change with time) in relation to the reference phase of the AC control voltage required for reducing the voltage across the battery to the limit value or less by a map arithmetical operation depending on deviations between the voltage across the battery and the limit value. In any case, the control voltage phase decision means 508 decides the phase angle $\gamma$ of the AC control voltage applied to the armature winding in each moment in relation to the reference phase when the voltage across the battery 2 exceeds the limit value, and the decided phase angle is provided to the control voltage generation timing arithmetical operation means 503.

When the rotational speed of the magneto generator is N1 in FIG. 2, as shown in FIG. 3, the phase angle (the non-control time corresponding phase angle) $\gamma$ of the AC control voltage Vu that passes the same phase current as the phase current iu that passes when the inverter 4 merely functions as a rectifier is 24° in relation to the reference phase O, and the phase angle $\alpha$ (an angle from the point P1 to the point S1 in FIG. 3F) of the fixed point P1 of the AC control voltage Vu is $\alpha=\delta+24°$, where $\delta$ is the phase angle of the fixed point P1 on the waveform of the phase current iu in relation to the reference phase O.

It is supposed that the voltage across the battery 2 exceeds the limit value, and thus the control voltage phase decision means 508 decides that an AC control voltage having a phase angle of an advance angle of 0° in relation to the reference phase (the point O) (an AC control voltage having the same phase as the no-load induced voltage Vuo) is applied to the armature winding 102. As shown in FIG. 3(D), a phase angle α1 of the fixed point P1 of the AC control voltage Vu having the advance angle of 0° is α1=δ+0°=δ. At this time, the control voltage generation timing arithmetical operation means 503 arithmetically operates time required for rotation through a section of an electrical angle of α1 at the present rotational speed of the generator as the control voltage generation timing detecting clocking data, arithmetically operates clocking data to be measured by the timer for deciding on/off timing of the switch elements of the inverter in application to the armature winding 102 of the AC control voltage having the same frequency as the induced voltage of the armature winding 102 decided by the rotational speed of the magneto generator, and causes the timer in the microprocessor to start measurement of the control voltage generation timing detecting clocking data. The arithmetical operation of the phase angle of the fixed point on the waveform of the phase current and the arithmetical operation of the control voltage generation timing detecting clocking data are performed substantially instantaneously, and thus the timing for the timer to start the measurement of the clocking data can be regarded as timing for detection of the fixed point P1 on the waveform of the phase current.

When the timer completes the measurement of the control voltage generation timing detecting clocking data (when the point S1' in FIG. 3D is detected), the inverter control means 504 controls on/off the switch elements of the inverter 4 at the timing arithmetically operated by the control voltage generation timing arithmetical operation means 503, thus converts the voltage across the battery 2 into the AC control voltage having the advance angle of 0° in FIG. 3(D), and applies the AC control voltage to the armature winding 102.

When the inverter 4 is controlled to convert the DC voltage into the AC voltage, a switch element selected from the plurality of switch elements that form the upper side of the bridge and a switch element selected from the plurality of switch elements that form the lower side of the bridge are used as a pair of switch elements simultaneously turned on with consideration that a short-circuit is not caused between the DC terminals 4a and 4b of the inverter when the switch elements are simultaneously turned on, and the switch elements are controlled on/off so as to change a combination of a pair of switch elements simultaneously turned on at appropriate timing.

It is supposed that the voltage across the battery 2 exceeds the limit value when the rotational speed of the magneto generator is N14 in the generation device in FIG. 1. At this time, the phase current phase arithmetical operation means 506 of the controller 5 arithmetically operates the phase angle of the fixed point P1 on the waveform of the phase current iu in relation to the reference phase O from the level of the phase current iu (an average value) detected by the current detector 6 and the rotational speed arithmetically operated by the rotational speed arithmetical operation means 505 without the AC control voltage being applied to the armature winding. The phase current phase correction means 507 corrects the phase angle with respect to the voltage across the battery 2 and the temperature of the armature winding, and detects that the phase angle of the fixed point P1 on the waveform of the phase current in relation to the reference phase O is δ. At this time, a charging current having the same level as the phase current iu that passes when the AC control voltage Vu having the phase angle of the delay angle of 24° in relation to the reference phase is applied to the armature winding 102 passes through the battery 2. Thus, in order to reduce the output of the magneto generator and reduce the voltage across the battery to the limit value or less, the phase angle of the AC control voltage needs to be advanced from the delay angle of 24°.

It is supposed that the control voltage phase decision means 508 decides that the phase angle of the AC control voltage is the advance angle of 0° for reducing the charging current. At this time, the control voltage generation timing arithmetical operation means 503 arithmetically operates the phase angle α1 of the advance angle 0° of the AC control voltage Vu with reference to the fixed point P1 on the waveform of the phase current, arithmetically operates time required for rotation through a section of an electrical angle α1 at the present rotational speed as control voltage generation timing detecting clocking data, and arithmetically operates clocking data to be measured by the timer for calculating on/off timing of each switch element of the inverter in application of the AC voltage having the same frequency as the induced voltage of the armature winding 102 from the inverter 4 to the armature winding 102. The inverter control means 504 immediately sets the clocking data arithmetically operated by the control voltage generation timing arithmetical operation means 503 to the timer and starts the measurement, and controls the switch elements of the inverter 4 so as to apply the AC control voltage having the advance angle of 0° from the battery 2 to the armature winding 102 when the timer completes the measurement of the clocking data (when the point S1' in FIG. 3D is detected).

Figure 4:
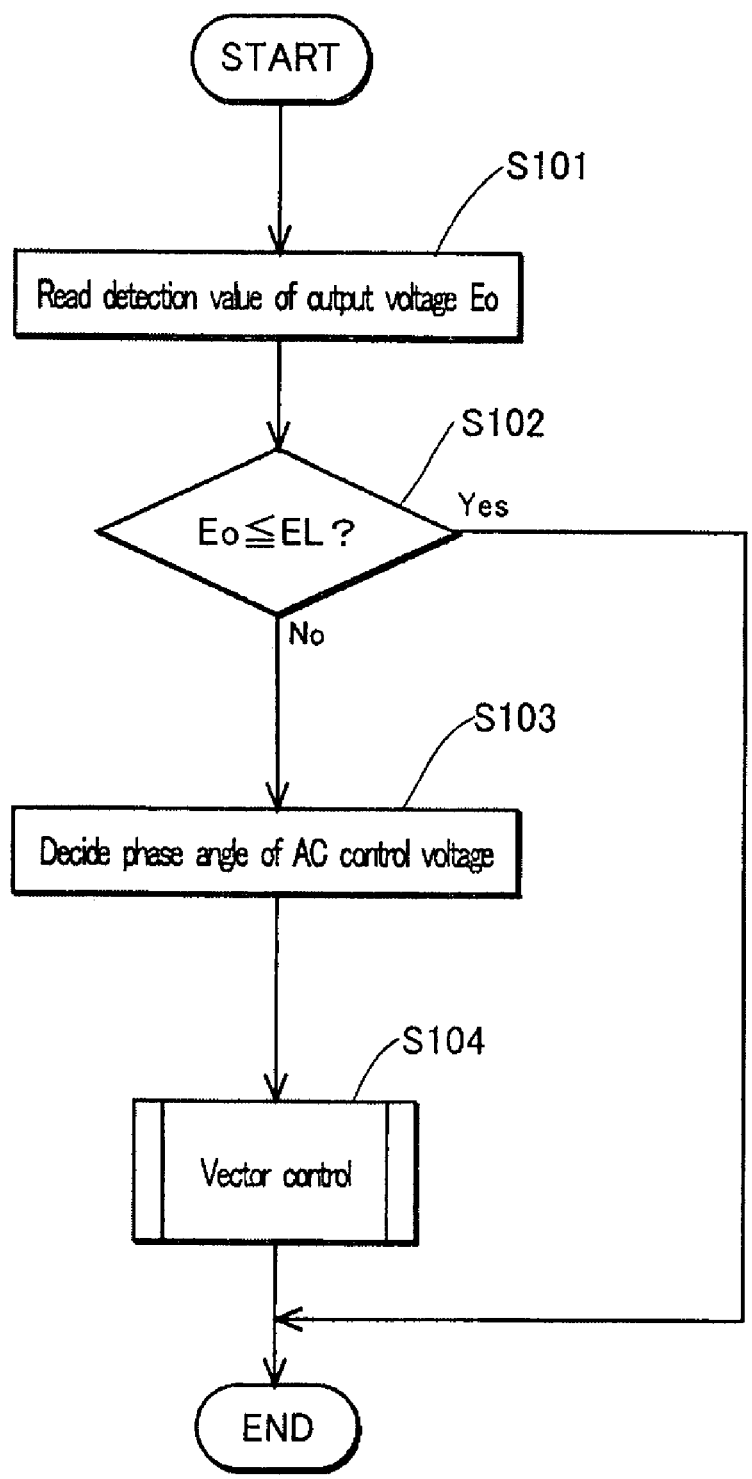
FIG. 4 is a flowchart showing an example of an algorithm of a task executed by a microprocessor for constructing control voltage phase decision means provided in a controller used in the embodiment in FIG. 1.
Figure 5:
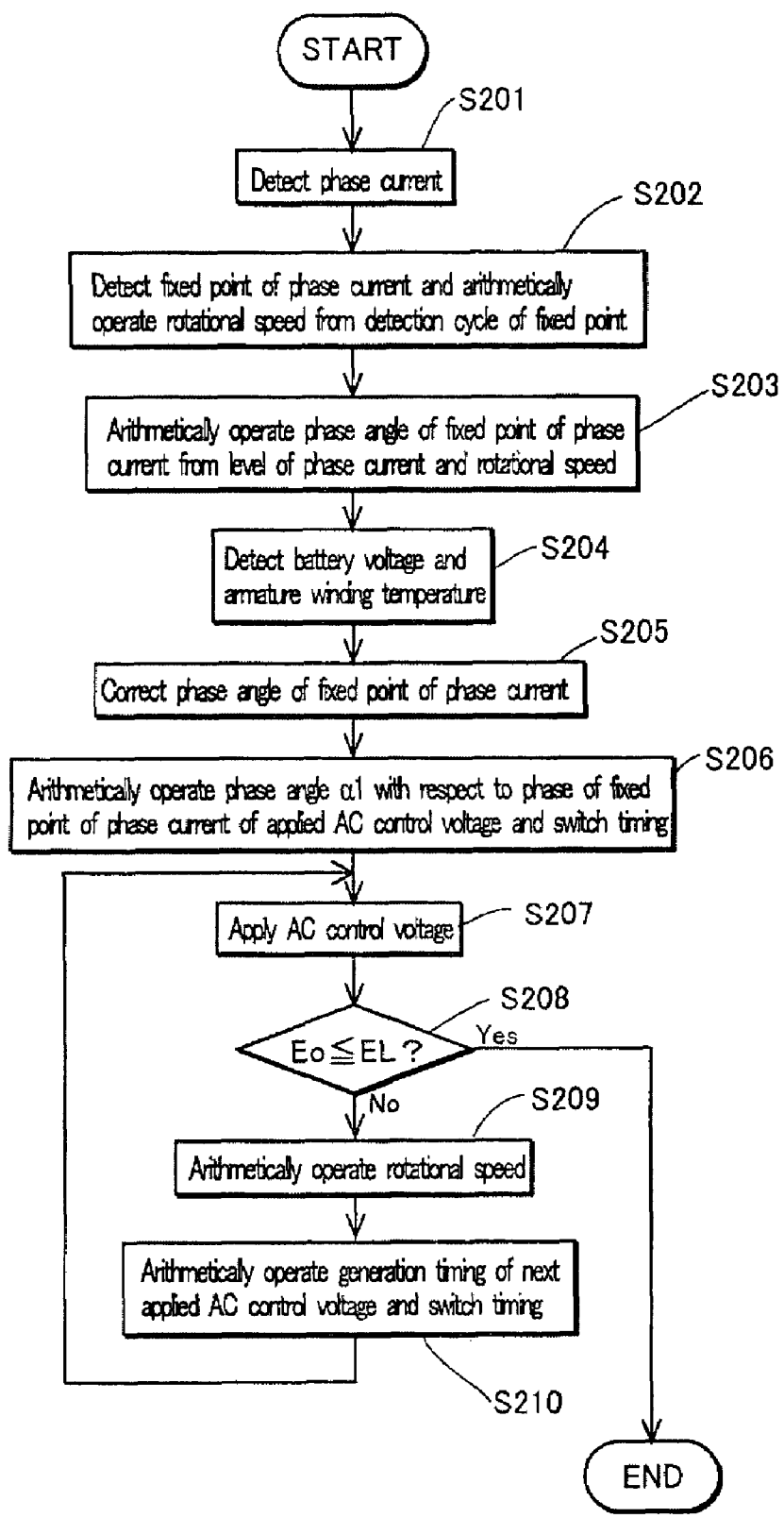
FIG. 5 is a flowchart showing an example of an algorithm of a task executed by the microprocessor for achieving means for constructing the controller used in the embodiment in FIG. 1.

FIGS. 4 and 5 show flowcharts of algorithms of programs executed by the microprocessor for constructing the means of the controller 5 in FIG. 1. FIG. 4 shows an algorithm of a task executed by the microprocessor repeatedly at small time intervals for achieving the control voltage phase decision means 508, and FIG. 5 shows an algorithm of a task executed when the output voltage (the voltage across the battery) E0 exceeds the limit value EL.

When the task in FIG. 4 is started, first in Step S101, the output voltage (the voltage across the battery) E0 detected by the voltage detector 8 is read, and it is determined in Step S102 whether the read output voltage E0 is the limit value EL or less. When it is determined that the output voltage E0 is the limit value EL or less, this processing is finished without performing any processing.

When it is determined in Step S102 that the output voltage E0 exceeds the limit value EL, the process proceeds to Step S103, and the phase angle of the AC control voltage applied to the armature winding for limiting the output voltage E0 to the limit value EL or less is decided. The phase angle of the AC control voltage may be arithmetically operated according to a deviation between the output voltage E0 and the limit value EL, or may be previously prepared and stored in the form of an advance angle amount per measurement time. In the case where the phase of the AC control voltage is stepwise advanced with time when the output voltage exceeds the limit value, the advance angle amount may be fixed or changed with time (for example, stepwise increased).

After the phase angle of the AC control voltage is decided in Step S103, the process moves to Step S104, and the AC control voltage is applied from the battery 2 to the armature winding 102 through the inverter 4 to perform vector control to reduce the output of the magneto generator.

In the vector control, the task in FIG. 5 is performed. When the task in FIG. 5 is started, first in Step S201, the detection value of the phase current is read. Then in Step S202, the fixed point (the π-phase zero cross point) P1 on the waveform of the phase current is detected from the output signal of the zero cross detection circuit 7, and the rotational speed N [rpm] of the magneto generator is arithmetically operated from the cycle (time interval) of detection of the fixed point P1. The zero cross detection circuit 7 generates pulse signals having different polarities between at the zero-phase zero cross point in shift of the phase current waveform from the negative half wave to the positive half wave and at the π-phase zero cross point in shift of the phase current waveform from the positive half wave to the negative half wave, and thus the π-phase zero cross point can be easily identified.

After the rotational speed is arithmetically operated in Step S202, the process proceeds to Step S203, the phase current phase arithmetical operation map is searched with respect to the level of the phase current (the average value) and the rotational speed read in Step S201 to arithmetically operate the phase of the fixed point P1 on the waveform of the phase current. Then, in Step S204, the voltage across the battery 2 and the temperature of the armature winding are read, the process proceeds to Step S205, and the phase of the fixed point P1 arithmetically operated in Step S203 is corrected with respect to the battery voltage and the temperature of the armature winding. Then in Step S206, the phase angle α1 (having a different value for each phase) with respect to the phase of the fixed point P1 of the AC control voltage first applied to each phase winding of the armature winding 102 is arithmetically operated, control voltage generation timing detecting clocking data to be measured by the timer for detecting the timing (the point S1' in FIG. 3D) for generating the AC control voltage to be applied to each phase winding is arithmetically operated from the phase angle α1 and the rotational speed, and the clocking data to be measured by the timer for detecting on/off timing of each switch element of the inverter in generation of the AC control voltage of each phase is arithmetically operated.

Then, the process proceeds to Step S207, and the processing for applying the AC control voltage to the armature winding 102 is performed. In this processing, the control voltage generation timing detecting clocking data arithmetically operated in Step S206 is measured by the timer, the switch elements of the inverter 4 are turned on/off at the timing arithmetically operated in Step S206 when the measurement is completed, the three-phase AC voltage having the same frequency as the output voltage of the armature winding 102 is generated from the inverter 4, and the three-phase AC voltage is applied to the armature winding 102 as the AC control voltage.

The first AC control voltage after the output voltage exceeds the limit value is applied to the armature winding 102 in Step S207, then in Step S208, it is determined whether the output voltage E0 is the limit value EL or less. When it is determined that the output voltage E0 is the limit value EL or less, this processing is finished without performing any processing thereafter.

When it is determined in Step S208 that the output voltage E0 exceeds the limit value EL, in Step S209, the rotational speed of the generator is arithmetically operated from the detection cycle of the fixed point P1 on the waveform of the phase current. Then, in Step S210, the generation timing of the AC control voltage next applied to the armature winding and the on/off timing of the switch elements of the inverter are arithmetically operated, and the process returns to Step S208, and the processing for generating the AC control voltage is performed.

When the difference between the phase angle of the next generated AC control voltage in relation to the reference phase and the phase angle of the last generated AC control voltage in relation to the reference phase is Δγ(≧0), the arithmetical operation of the generation timing of the AC control voltage in Step S210 is performed by arithmetically operating time between generation timing of the last generated AC control voltage and generation timing of the next generated AC control voltage (time required for rotation through a section of an electrical angle of 2π±Δγ) based on the rotational speed arithmetically operated in Step S209.

Steps S207 to S210 are repeated while the output voltage E0 exceeds the limit value EL, and when it is determined in Step S207 that the output voltage E0 reaches the limit value EL or less, the task in FIG. 5 is finished.

When vector control is performed by the algorithm in FIG. 5, the fixed point detection means 501 is comprised by the process for detecting the fixed point on the waveform of the phase current in Step S202, and the rotational speed arithmetical operation means 505 is comprised by the process for arithmetically operating the rotational speed in Step 202. The phase current phase correction means 507 is comprised by Step S205, and the control voltage generation timing arithmetical operation means is comprised by Steps S206, S208 and S210. Further, the inverter control means 504 is comprised by Step S207.

In the above description, the generation timing of the AC control voltage applied to the armature winding for the second time or thereafter after the output voltage E0 exceeds the limit value EL is calculated with reference to the generation timing of the AC control voltage generated earlier. However, the generation timing of the AC control voltage applied to the armature winding for the second time or thereafter after the output voltage E0 exceeds the limit value EL may be calculated with reference to the phase of the fixed point on the waveform of the phase current. A construction of an embodiment in which the generation timing of the AC control voltage applied to the armature winding for the second time or thereafter after the output voltage E0 exceeds the limit value EL is calculated with reference to the phase of the fixed point on the waveform of the phase current is shown in FIG. 6.

Figure 6:
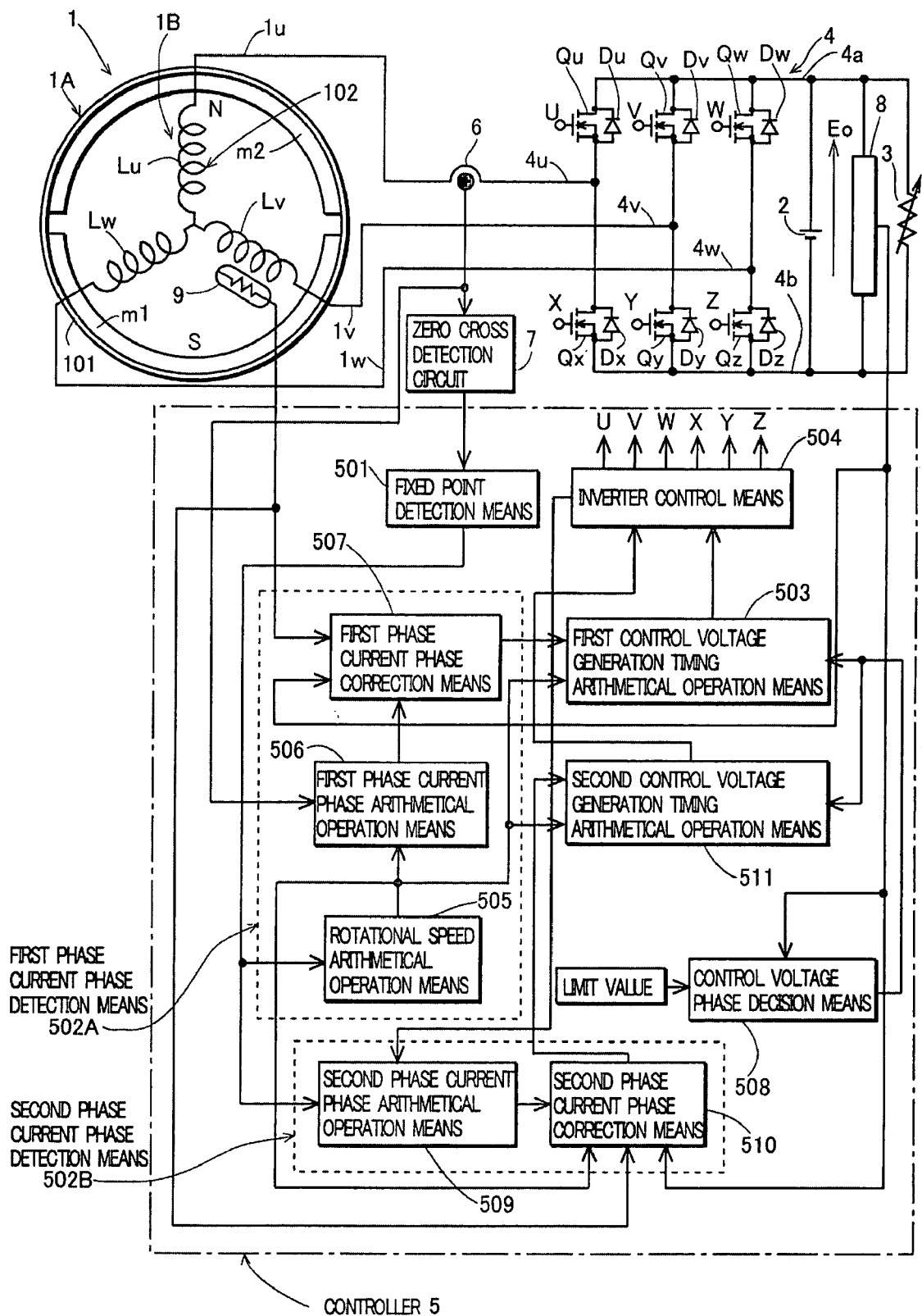
FIG. 6 is a block diagram of a construction of another embodiment of the present invention.

In the embodiment in FIG. 6, a controller 5 is comprised of fixed point detection means 501, first phase current phase detection means 502A, second phase current phase detection means 502B, first control voltage generation timing arithmetical operation means 503, second control voltage generation timing arithmetical operation means 511, inverter control means 504, and control voltage phase decision means 508.

The fixed point detection means 501 is comprised so as to detect a fixed point that appears every lapse of a time period corresponding to a half cycle of the waveform of the phase current, and comprised, in the embodiment, so as to differentiate between and detect a zero-phase zero cross point and a π-phase zero cross point of a phase current detected by a zero cross detection circuit 7. In the embodiment, generation timing of an AC control voltage is calculated with reference to the π-phase zero cross point among the two zero cross points.

The first phase current phase detection means 502A is comprised of rotational speed arithmetical operation means 505, first phase current phase arithmetical operation means 506, and first phase current phase correction means 507. The rotational speed arithmetical operation means 505 is comprised so as to store time of detection of the zero-phase zero cross point and the π-phase zero cross point of the phase current, and arithmetically operate a rotational speed of a magneto generator from the time period corresponding to the half cycle of the phase current.

The first phase current phase arithmetical operation means 506 and the first phase current phase correction means 507 are comprised in the same manner as the phase current phase arithmetical operation means 506 and the phase current phase correction means 507 in FIG. 1, and the first phase current phase arithmetical operation means 506 uses one (the π-phase zero cross point in the embodiment) of the two fixed points detected during a time period of one cycle of the waveform of the phase current as a specific fixed point, and searches a map with respect to the rotational speed arithmetically operated by the rotational speed arithmetical operation means 505 and the level of the phase current detected by a current detector 6 to arithmetically operate the phase angle of the specific fixed point in relation to the reference phase.

The first phase current phase correction means 507 corrects the phase angle arithmetically operated by the first phase current phase arithmetical operation means 506 with respect to the voltage E0 across the battery 2 detected by a voltage detector 8 and the temperature of the armature winding detected by a temperature sensor.

The second phase current phase detection means 502B detects the phase of the fixed point on the waveform of the phase current used as a reference in calculating generation timing of the AC control voltage applied to the armature winding for the second time or thereafter after the output voltage exceeds the limit value, and is comprised of second phase current phase detection means 509, and second phase current phase correction means 510. The second phase current phase detection means 509 detects a phase of a specific fixed point on the waveform of the phase current that appears after the generation timing of the AC control voltage with reference to the generation timing of the AC control voltage generated earlier. The second phase current phase correction means 510 corrects the phase of the fixed point on the waveform of the phase current detected by the second phase current phase detection means 509 with respect to the rotational speed arithmetically operated by the rotational speed arithmetical operation means 505, the voltage across the battery detected by the voltage detector 8, and the temperature detected by the temperature sensor 9.

The phase angle of the fixed point on the waveform of the phase current corrected by the second phase current phase correction means 510 in relation to the reference phase is provided to second control voltage generation timing arithmetical operation means 511. The second control voltage generation timing arithmetical operation means 511 arithmetically operates generation timing of the AC control voltage with reference to the phase of the fixed point on the waveform of the phase current corrected by the second phase current phase correction means 510, and is comprised in the same manner as the control voltage generation timing arithmetical operation means 511 in FIG. 1.

Clocking data to be measured by a timer for detecting the generation timing of the AC control voltage arithmetically operated by the first control voltage generation timing arithmetical operation means 503 and clocking data to be measured by the timer for detecting on/off timing of the switch elements of the inverter are provided to the inverter control means 504. The inverter control means 504 controls the switch elements of the inverter so as to generate the AC control voltage at timing arithmetically operated by the first control voltage generation timing arithmetical operation means 503 when the AC control voltage is first generated after the voltage E0 across the battery 2 exceeds the limit value EL, and generate the AC control voltage at timing arithmetically operated by the second control voltage generation timing arithmetical operation means 511 when the AC control voltage is generated for the second time or thereafter after the voltage across the battery 2 exceeds the limit value.

In the embodiment in FIG. 6, the control voltage phase decision means 508 is comprised in the same manner as in the embodiment in FIG. 1, and decides a phase angle γ of the AC control voltage in relation to the reference phase in each moment when the voltage across the battery 2 exceeds the limit values and provides the decided phase angle to the first control voltage generation timing arithmetical operation means 503 and the second control voltage generation timing arithmetical operation means 511.

The second phase current phase arithmetical operation means 509 in FIG. 6 arithmetically operates the fixed point on the waveform of the phase current as described below. It is supposed that the output voltage E0 exceeds the limit value EL when the rotational speed is N1, and as shown in FIG. 3(D), the first AC control voltage Vu is generated having a phase angle of α1 with respect to a specific fixed point P1 on the waveform of the phase current detected by the first phase current phase detection means 502A. At this time, the second phase current phase arithmetical operation means 509 measures time (time corresponding to an angle θ0 in FIG. 3D) T0 from generation timing of the AC control voltage (the point S1' in FIG. 3D) to timing for detecting a zero-phase zero cross point P2' of the phase current that appears immediately thereafter. Also, the second phase current phase arithmetical operation means 509 measures time (time corresponding to the shown angle β) Tβ from generation timing (the point S1') of the first applied AC control voltage to detection of a next fixed point P1' of the phase current, and arithmetically operates the present rotational speed of the generator from time Tβ−T0 corresponding to the shown section of β−θ0 (=π). Then, the angle β (a phase difference between the applied AC control voltage and the phase current) is arithmetically operated from the arithmetically operated rotational speed and Tβ, and a phase angle δ' in relation to the reference phase of the fixed point P1' on the waveform of the phase current that appears after the application of the AC control voltage is arithmetically operated by δ'=2π−(β+γ) (γ is a phase angle of the AC control voltage in relation to the reference phase and has a plus sign when it is a delay angle phase).

In this manner, the phase angle δ' in relation to the reference phase of the specific fixed point P1' on the waveform of the phase current after the application of the AC control voltage is calculated, and an angle α2 to generation timing of the next applied AC control voltage (the AC control voltage of an advance angle of 0° in the shown example) is calculated with reference to the phase of the specific fixed point P1'. Then, time required for the generator to rotate through a section of an electrical angle of α2 is arithmetically operated as control voltage generation timing detecting clocking data, the clocking data is measured by a timer, and generation timing of the AC control voltage applied to the armature winding for the second time or thereafter after the output voltage exceeds the limit value is detected.

Figure 7:
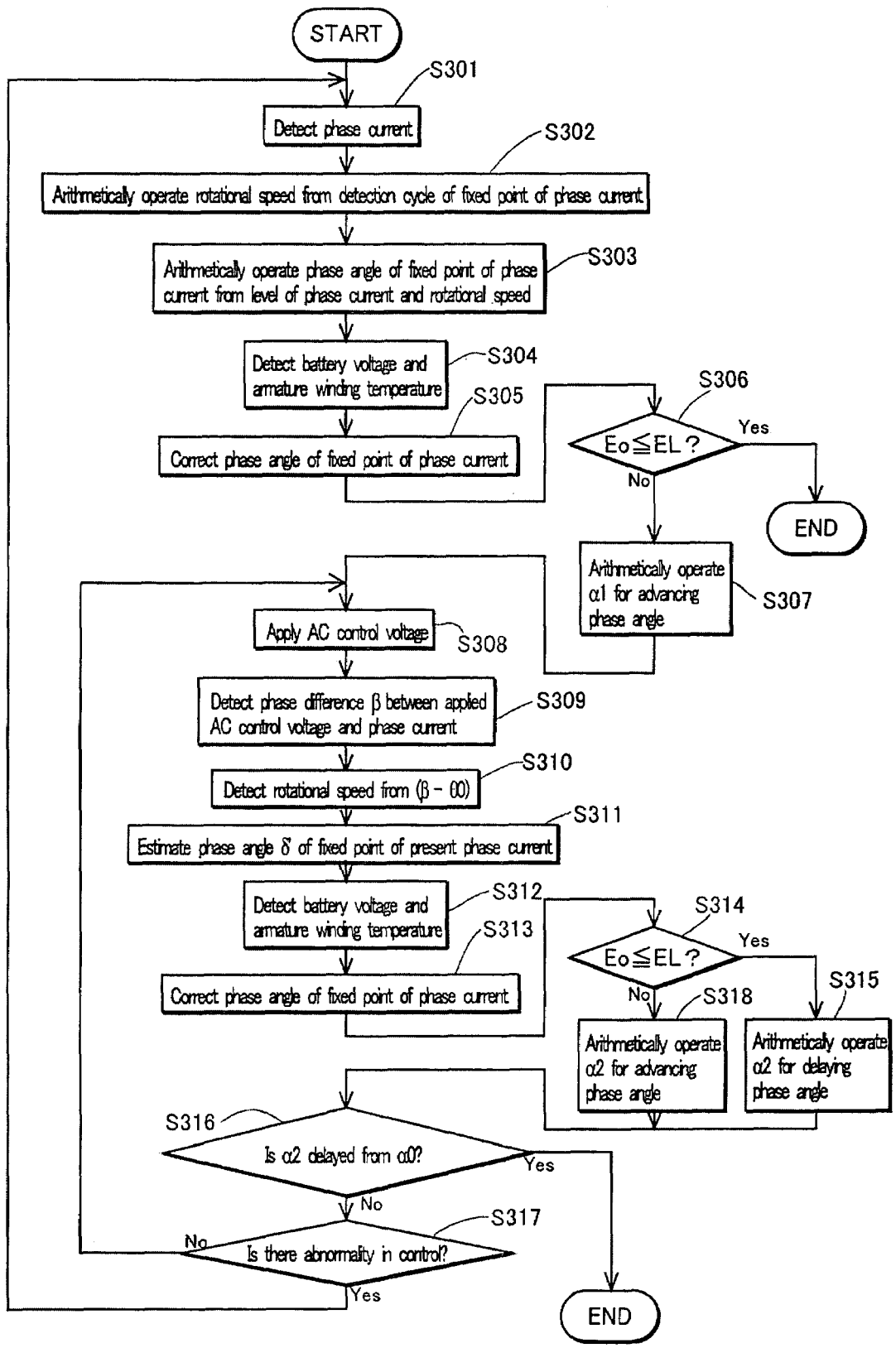
FIG. 7 is a flowchart showing an example of an algorithm of a task executed by a microprocessor for achieving means for constructing a controller used in the embodiment in FIG. 6.

FIG. 7 shows a flowchart of an algorithm of a task executed by a microprocessor for performing vector control in the embodiment in FIG. 6. The algorithm of the task executed by the microprocessor for achieving, the control voltage phase decision means 508 is the same as that in FIG. 4.

The task in FIG. 7 is executed when the output voltage exceeds the limit value EL, and the phase angle of the AC control voltage is decided in Step S103 in FIG. 4. According to the algorithm in FIG. 7, first in Step S301, a detection value of a phase current is read. Then in Step. S302, a specific fixed point (a π-phase zero cross point) on the waveform of the phase: current is detected from an output signal of the zero cross detection circuit 7, and a rotational speed N [rpm] of a magneto generator is arithmetically operated from time between detection of the last fixed point (a zero-phase zero cross point) and detection of this specific fixed point (time corresponding to a section of a half wave of the phase current).

After the rotational speed is arithmetically operated in Step S302, the process proceeds to Step S303, and the phase current phase arithmetical operation map is searched with respect to the level of the phase current (an average value) read in Step S301 and the rotational speed arithmetically operated in Step S302 to arithmetically operate the phase of the specific fixed point P1 on the waveform of the phase current. Then in Step S304, the voltage across the battery 2 and the temperature of the armature winding are read, the process proceeds to Step S305, and the phase of the fixed point P1 arithmetically operated in Step S303 is corrected with respect to the battery voltage and the temperature of the armature winding. Then in Step S306, the output voltage E0 and the limit value EL are compared, and when the output voltage E0 is the limit value EL or less, this processing is finished without performing any processing thereafter.

When it is determined in Step S306 that the output voltage E0 exceeds the limit value, the process proceeds to Step S307, the phase angle $\alpha 1$ (having different values for each phase) with respect to the phase of the fixed point P1 of the AC control voltage is arithmetically operated so as to change, toward an advance side, the phase of the AC control voltage first applied to each phase winding of the armature winding 102 for reducing the output voltage E0 to the limit value EL or less, control voltage generation timing detecting clocking data measured by the timer for detecting the timing (the point S1' in FIG. 3D) for generating the AC control voltage to be applied to each phase winding is arithmetically operated from the phase angle $\alpha 1$ and the rotational speed, and on/off timing of each switch element of the inverter in generation of the AC control voltage of each phase is arithmetically operated.

Then, the process proceeds to Step S308, and the processing for applying the AC control voltage to the armature winding 102 is performed. In this processing, the control voltage generation timing detecting clocking data arithmetically operated in Step S307 is measured by the timer, and when the measurement is completed, the switch elements of the inverter 4 are turned on/off at the timing arithmetically operated in Step S307, and three-phase AC voltages having the same frequency as the output voltage of the armature winding 102 are generated from the inverter 4, and applied to the armature winding 102 as the AC control voltage.

In Step S308, the first AC control voltage is applied to the armature winding 102 after the output voltage E0 exceeds the limit value EL, then in Step S309, the phase difference $\beta$ between the AC control voltage applied to the armature winding and the phase current is detected, and in Step S310, the rotational speed of the magneto generator is arithmetically operated from time corresponding to the section of $(\beta - \theta 0)°$. Then in Step S311, the phase angle $\delta'$ of the specific fixed point on the waveform of the present phase current is estimated.

Then in Step S312, the battery voltage and the temperature of the armature winding are read, and in Step S313, the phase of the specific fixed point on the waveform of the phase current is corrected. This correction is performed in the same manner as the correction of the phase of the phase current by the first phase current phase correction means. Then in Step S314, the output voltage E0 and the limit value EL are compared, and when the output voltage E0 is the limit value EL or less, the process proceeds to Step S345, and the phase angle $\alpha 2$ of the AC control voltage is arithmetically operated with reference to the phase of the specific fixed point on the waveform of the phase current so as to change the phase of the AC control voltage applied to the armature winding toward the delay side, control voltage generation timing detecting clocking data to be measured by the timer for detecting the timing for generating the AC control voltage to be applied to each phase winding is arithmetically operated from the phase angle $\alpha 2$ and the rotational speed, and on/off timing of each switch element of the inverter in generation of the AC control voltage of each phase is arithmetically operated.

Then, the process proceeds to Step S316, and it is determined whether the phase angle $\alpha 2$ arithmetically operated in Step S315 is delayed from a phase angle (a non-control time corresponding phase angle) $\alpha 0$ of the AC control voltage that passes a phase current having the same level as the phase current that passes when no AC control voltage is applied to the armature winding at each rotational speed (the phase current that passes in the state where the circuit between the armature winding and the voltage accumulation means merely functions as a rectifier). When it is determined that the phase angle $\alpha 2$ is not delayed from the non-control time corresponding phase angle $\alpha 0$, the process proceeds to Step S317, and it is determined whether there is an abnormality in control. When it is determined that there is no abnormality, the process returns to Step S308, the processing for applying the AC control voltage is performed, and control to maintain the output voltage E0 at the limit value EL or less is continued. When it is determined in Step S317 that there is an abnormality in the control, the process returns to Step S301, and the control is restarted, and the phase angle of the specific fixed point on the waveform of the phase current in relation to the reference phase is again calculated without the AC control voltage being applied.

The abnormality in the control determined in Step S317 is, for example, a state where the output voltage E0 does not reach the limit value or loss even if the control to apply the AC control voltage to the armature winding is continued for a certain time, or a state where the phase difference $\beta$ between the AC control voltage and the phase current is arithmetically operated as an abnormal value (a state where the phase of the phase current cannot be correctly estimated).

When it is determined in Step S316 that the phase angle $\alpha 2$ is delayed from the non-control time corresponding phase angle $\alpha 0$, this processing is finished without performing any processing thereafter.

When it is determined in Step S314 in the task in FIG. 7 that the output voltage E0 exceeds the limit value EL, the process moves to Step S318, the phase angle $\alpha 2$ of the AC control voltage is arithmetically operated with reference to the phase of the specific fixed point on the waveform of the phase current so as to advance the phase angle of the AC control voltage, the control voltage generation timing detecting clocking data to be measured by the timer for detecting the timing for generating the AC control voltage to be applied to each phase winding is arithmetically operated from the phase angle $\alpha 2$ and the rotational speed, and the on/off timing of each switch element of the inverter in generation of the AC control voltage of each phase is arithmetically operated, and then the process moves to Step S316.

According to the algorithm in FIG. 7, the fixed point detection means 501 is comprised by the process for detecting the fixed point on the waveform of the phase current, in Step S302, and the rotational speed arithmetical operation means 505 is comprised by the process for arithmetically operating the rotational speed in Step 302. Also, the first phase current phase correction means 507 is comprised by Step S305, and the first control voltage generation timing arithmetical operation means 503 is comprised by Step S307. Further, the second phase current phase arithmetical operation means 509 is comprised by Steps S309 to S311, and the second phase current phase correction means 510 is comprised by Steps S312 and S313. The inverter control means 504 is comprised by Step S308.

In the above described construction, there are provided the second phase current phase detection means 509 for detecting the phase of the specific fixed point on the waveform of the phase current that; appears after the generation timing of the AC control voltage with reference to the generation timing of the AC control voltage, and the second phase current phase correction means 510 for correcting the phase of the phase current detected by the second phase current phase detection means with respect to the rotational speed arithmetically operated by the rotational speed arithmetical operation means 505, the voltage detected by the voltage detector 8, and the temperature of the armature winding detected by the temperature sensor 9, and the second control voltage generation timing arithmetical operation means is comprised so as to arithmetically operate the generation timing of the AC control voltage generated for the second time or thereafter with reference to the phase of the phase current corrected by the second phase current phase correction means 510. However, the second phase current phase detection means 509 and the second phase current phase correction means 510 may be omitted, and the second control voltage generation timing arithmetical operation means 511 may be comprised so as to arithmetically operate generation timing of a next generated AC control voltage: with reference to the generation timing of the AC control voltage.

In each of the embodiments, the current detector 6 that detects the phase current of one phase is provided, and the control voltage generation timing arithmetical operation means is comprised so as to calculate generation timing of the three-phase AC control voltage with reference to the phase of the fixed point on the waveform of the phase current of one phase detected by the current detector. However, it may be allowed that a current detector that detects a phase current for each of three phases is provided, and the control voltage generation timing arithmetical operation means is comprised so as to calculate generation timing of the AC control voltage of each phase with reference to the phase of the fixed point on the waveform of the phase current of each phase detected by the phase detection means. The current detector that detects the phase current for each of three phases is provided to calculate the generation timing of the AC control voltage of each phase with reference to the phase of the fixed point on the waveform of the phase current of each phase detected by the phase detection means, thereby increasing accuracy of the generation timing of the AC control voltage.

Also, it may be allowed that generation timing of an AC control voltage of a delayed phase is calculated with reference to a phase of a fixed point on a waveform of a phase current of an advanced phase, for example, generation timing of an AC control voltage of a V-phase delayed from a U-phase is calculated with reference to a phase of a fixed point on a waveform of a U-phase current, generation timing of an AC control voltage of a W-phase delayed from the V-phase is calculated with reference to a phase of a fixed point on a waveform of a phase current of the V-phase, and generation timing of an AC control voltage of the U-phase delayed from the W-phase is calculated with reference to a phase of a fixed point on a waveform of a phase current of the W-phase.

In the above description, the phase of the fixed point on the waveform of the phase current of the magneto generator is arithmetically operated with respect to the rotational speed and the level of the phase current, and the timing for generating the AC control voltage is decided with reference to the phase of the fixed point on the waveform of the phase current. However, it may be allowed that the voltage across each phase winding of the magneto generator is detected as a phase voltage, a phase of a fixed point on a waveform of the phase voltage is arithmetically operated with respect to the rotational speed and the level of the phase current, and timing for generating the AC control voltage is decided with reference to the phase of the fixed point on the waveform of the arithmetically operated phase voltage.

Figure 8:
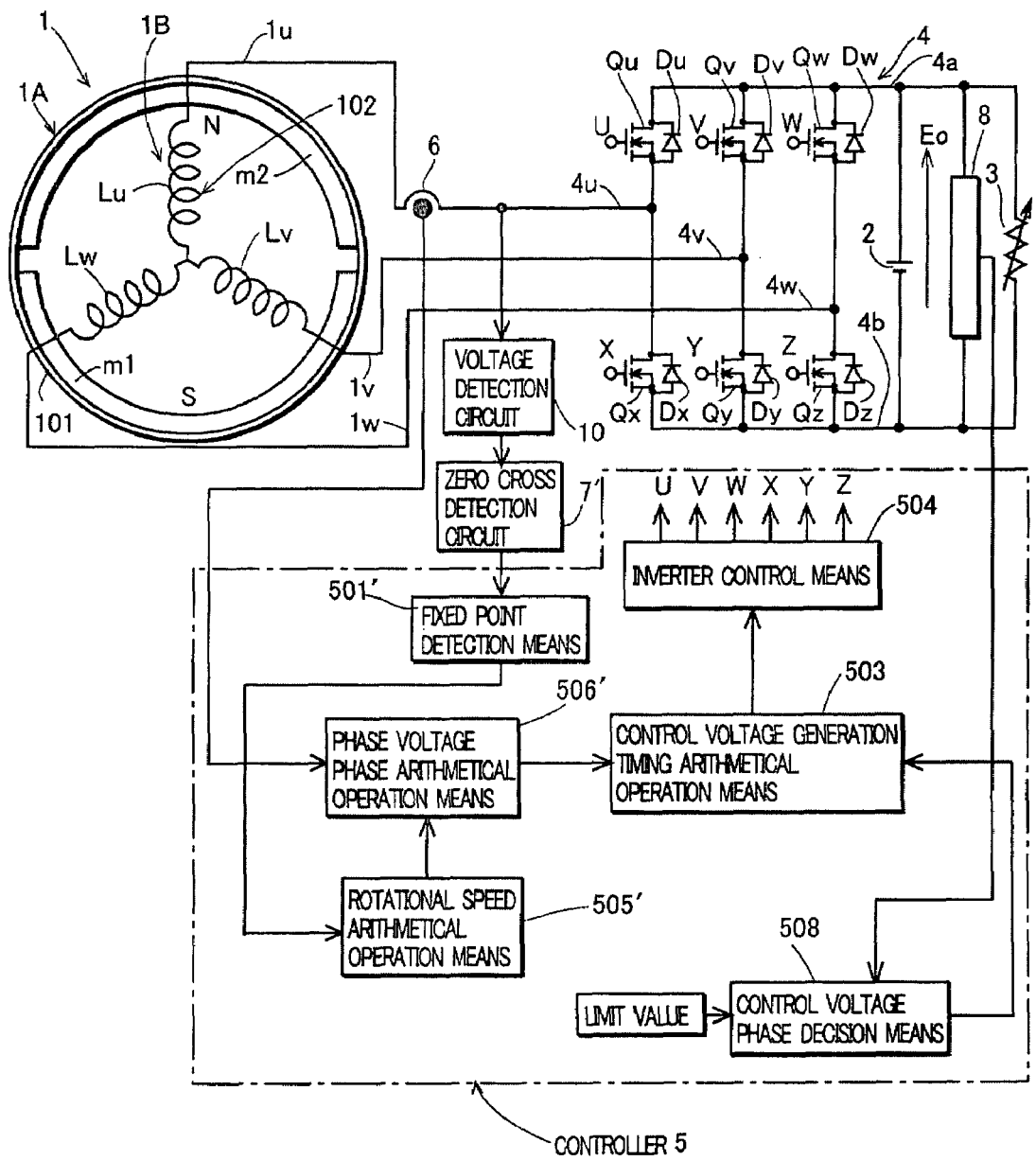
FIG. 8 is a block diagram of a construction of a further embodiment of the present invention.

FIG. 8 shows an exemplary construction of the controller 5 in the case where the phase of the fixed point on the waveform of the phase voltage is arithmetically operated with respect to the rotational speed and the level of the phase current, and timing for generating the AC control voltage is decided with reference to the phase of the fixed point on the waveform of the arithmetically operated phase voltage. In the example in FIG. 8, besides the current detector 6 that detects the phase current, there are provided a voltage detection circuit 10 that detects a phase voltage, and a zero cross detection circuit 7' that detects a zero cross point of the phase voltage detected by the voltage detection circuit 10. The controller 5 is comprised of fixed point detection means 501', rotational speed arithmetical operation means 505', phase voltage phase arithmetical operation means 506', control voltage generation timing arithmetical operation means 503, inverter control means 504, and control voltage phase decision means 508.

The fixed point detection means 501' detects a fixed point on a waveform of the phase voltage among zero cross points detected by the zero cross detection circuit 7', and the rotational speed arithmetical operation means 505' arithmetically operates a rotational speed of a magneto generator from a cycle of detection of the fixed point on the waveform of the phase voltage by the fixed point detection means 501'. The phase voltage phase arithmetical operation means 506' searches a phase voltage phase arithmetical operation map that provides a relationship between the level of the phase current, the rotational speed of the magneto generator, and a phase angle of the fixed point on the waveform of the phase voltage in relation to a reference phase, with respect to the level of the phase current detected by the current detector 6 and the rotational speed arithmetically operated by the rotational speed arithmetical operation means 505' to arithmetically operate the phase angle of the phase voltage in relation to the reference phase. The control voltage generation timing arithmetical operation means 503 is comprised so as to arithmetically operate timing for generating the AC control voltage with reference to the phase of the fixed point of the phase voltage arithmetically operated by the phase voltage phase arithmetical operation means 506', and the inverter control means 504 is comprised so as to control the switch element of the inverter to generate the AC control voltage at the timing arithmetically operated by the control voltage generation timing arithmetical operation means 503.

The phase voltage phase arithmetical operation map is prepared by using a relationship between the phase angle of the AC control voltage to be applied to the armature winding for passing a phase current having the same level as a phase current that passes through the armature winding without the AC control voltage being applied to the armature winding, the rotational speed of the magneto generator, and the level of the phase current.

The fixed point on the waveform of the phase voltage may be any of a zero cross point (a π-phase zero cross point) in shift of the phase voltage waveform from a positive half wave to a negative half wave, a zero cross point (a zero-phase zero cross point) in shift of the phase voltage waveform from the negative half wave to the positive half wave, a peak point of the positive half wave or the negative half wave of the phase voltage waveform, and a point at which the positive half wave or the negative half wave of the phase voltage reaches a set threshold value. In the embodiment, the π-phase zero cross point of the phase voltage waveform is used as the fixed point.

The phase voltage phase detection means 506' may be comprised so as to detect a phase of a fixed point on a waveform of a phase voltage of one phase only, or detect a phase of a phase current of each of three phases. In the case where the phase voltage detection means is comprised so as to detect the phase of the fixed point on the waveform of the phase voltage of one phase only, the control voltage generation timing arithmetical operation means is comprised so as to calculate the generation timing of the three-phase AC control voltage with reference to the phase of the phase voltage of one phase. In the case where the phase voltage detection means is comprised so as to detect the phase of the phase current of each of the three phases, the control voltage generation timing arithmetical operation means 503 is comprised so as to calculate the generation timing of the AC control voltage of each phase with reference to the phase of the phase voltage of each phase detected by the phase voltage phase detection means.

The level of the phase current, the rotational speed, and the phase of the phase voltage (the AC control voltage) in relation to the reference phase have the relationship in FIG. 2, and the relationship can be used to easily prepare a map for arithmetically operating the phase angle of the phase voltage in relation to the reference phase without the AC control voltage being applied, with respect to the level of the phase current and the rotational speed. For example, when the rotational speed is N1, the above described map can be searched with respect to the level of the phase current (for example, an average value) detected without the AC control voltage being applied and the rotational speed to detect that a phase angle of a fixed point S2 on a waveform of a phase voltage in relation to a reference phase is a delay angle of π-24°, which shows that the π-phase zero cross point S2 of the phase voltage is delayed by π-24° in relation to the reference phase (the point O). The phase of the fixed point on the waveform of the phase voltage can be thus calculated, thereby allowing the generation timing of the AC control voltage to be applied to the armature winding to be calculated with reference to the fixed point on the waveform of the phase voltage. For example, if time is arithmetically operated required for rotation through a section of an electrical angle of π-24° when a fixed point S1 on the waveform of the phase voltage is detected, the generation timing of the AC control voltage of an advance angle of 0° can be calculated.

In this case, when the control voltage generation timing arithmetical operation means 503 arithmetically operates generation timing of the AC control voltage to be applied to the armature winding for the second time or thereafter after the output voltage exceeds the limit value, the control voltage generation timing arithmetical operation means 503 arithmetically operates generation timing of a next applied AC control voltage with reference to the phase of the fixed point on the waveform of the AC control voltage applied earlier. For example, in FIG. 3(D), when the AC control voltage is generated at the point S1' and then the AC control voltage is again generated at the next point S1', a π-phase zero cross point S2' delayed by π from the point S1' is used as a fixed point, and time required for rotation through a section of an electrical angle of π from the point S2' is arithmetically operated to calculate the generation timing of the next applied AC control voltage. Generally, when a delay angle of the AC control voltage applied to the armature winding in relation to the reference phase is γ, the phase of the fixed point on the waveform of the phase voltage used as a reference for arithmetically operating the generation timing of the next AC control voltage is delayed by π+γ in relation to the reference phase, and when an advance angle of the AC control voltage applied to the armature winding in relation to the reference phase is y, the phase of the fixed point on the waveform of the phase voltage used as a reference for arithmetically operating the generation timing of the next AC control voltage is delayed by π-γ in relation to the reference phase. In this manner, the phase angle of the fixed point on the waveform of the AC control voltage applied earlier to the armature winding in relation to the reference phase can be always specified, and thus the generation timing of the next generated AC control voltage can be calculated with reference to the phase of the fixed point.

Figure 9:
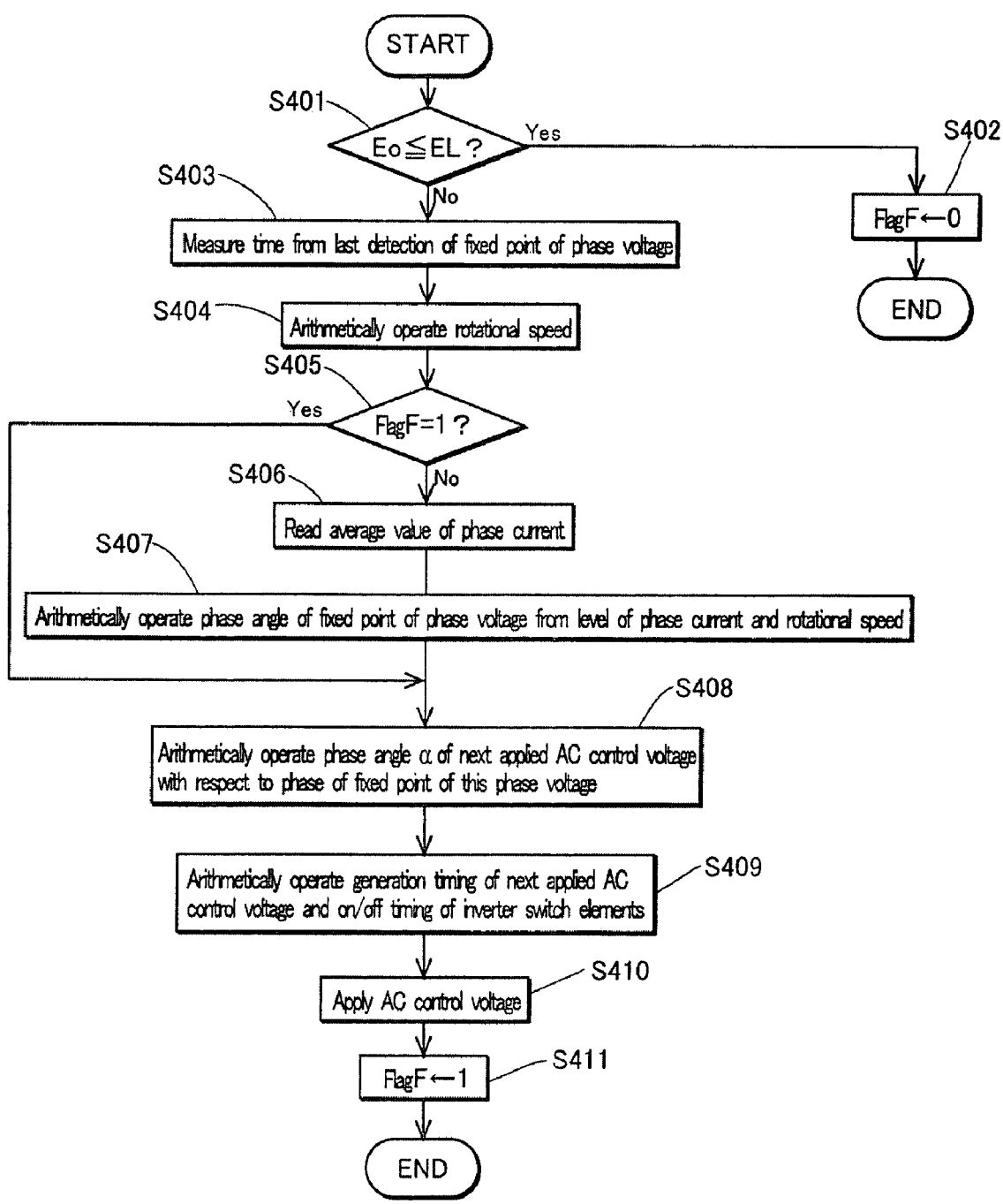
FIG. 9 is a flowchart showing an example of an algorithm of a task executed by a microprocessor for achieving means for constructing a controller used in the embodiment in FIG. 8.

FIG. 9 shows a flowchart of an algorithm of a task executed by the microprocessor for achieving each means for constructing the controller in FIG. 8. The task in FIG. 9 is executed every time the zero cross detection circuit 7' detects the π-phase zero cross point of the phase voltage. According to the algorithm, first in Step S401, it is determined whether the output voltage E0 is the limit value EL or less. When it is determined that the output voltage E0 is the limit value or less, the process proceeds to Step S402, a flag F is reset to zero, and the task is finished.

When it is determined in Step S401 that the output voltage E0 is not the limit value or less, the process proceeds to Step S403, and time between the last detection of the fixed point on the waveform of the phase voltage and this detection of the fixed point on the waveform of the phase voltage from a measurement value of a timer that counts clock pulses in the microprocessor. Then, the process proceeds to Step S404, and the rotational speed is arithmetically operated from the time measured in Step 403 (time required for rotation through a section of an electrical angle of 2π).

After the rotational speed is arithmetically operated, it is determined in Step S405, whether the flag F is set to one. When it is determined that the flag F is not set to one, the process moves to Step S406, an average value of the phase current detected by the current detector 6 is read, and in Step S407, a map is searched with respect to the level of the phase current and the rotational speed to arithmetically operate the phase angle of the fixed point on the waveform of the phase voltage (the π-phase zero cross point) in relation to the reference phase. Then in Step S408, an angle α of the next applied AC control voltage to the zero-phase zero cross point is arithmetically operated with respect to the phase of the fixed point on the waveform of the phase voltage, and in Step S409, time required for rotation through a section of an electrical angle of α is arithmetically operated as clocking data for measuring the generation timing of the next applied AC control voltage, and clocking data to be measured by the timer for deciding on/off timing of the switch elements of the inverter required for generating the AC control voltage is arithmetically operated. Then in Step S410, the measurement of the clocking data is started by the timer, and when the measurement is completed, a drive signal is provided to the inverter 4 to output the AC control voltage from the inverter 4. After the AC control voltage is output from the inverter 4, the flag F is set to one in Step S411, and the task is finished.

If it is determined in Step S401 that the output voltage E0 is not the limit value EL or less when the next fixed point (the π-phase zero cross point) on the waveform of the phase voltage is detected and the task in FIG. 9 is again executed, Steps S403 and S404 are executed to arithmetically operate the rotational speed, and it is determined in Step S405 whether the flag F is one. At this time, the flag F is one, and thus Steps S406 and S407 for calculating the phase of the fixed point on the waveform of the phase current are omitted, Steps S408 and S409 are performed, and clocking data to be measured by the timer for measuring the generation timing of the next applied AC control voltage and clocking data to be measured by the timer for deciding the on/off timing of the switch elements of the inverter are arithmetically operated.

When the AC control voltage is applied to the armature winding and thus the output voltage reaches the limit value or less, it is determined in Step S401 in FIG. 9 that E0≦EL, and the application of the AC control voltage is stopped. If this increases the output of the magneto generator and the output voltage exceeds the limit value, the vector control to apply the AC control voltage having a predetermined phase angle to the armature winding is again performed, thereby restraining the output of the magneto generator. These operations are repeated to perform control so that the output voltage E0 does not exceed the limit value EL.

According to the algorithm in FIG. 9, the rotational speed arithmetical operation means 505' is comprised by Steps S403 and S404, and the phase voltage phase arithmetical operation means 506' is comprised by Steps S406 and S407. Also, the control voltage generation timing arithmetical operation means 503 is comprised by Steps S408 and S409, and the inverter control means 504 is comprised by Step S410.

In the embodiment in FIG. 8, an algorithm of a task for constructing the control voltage phase decision means 508 may be the same as that in FIG. 4.

In each of the embodiment, the current detector 6 that detects the phase current of one phase is provided, and the control voltage generation timing arithmetical operation means is comprised so as to calculate generation timing of the three-phase AC control voltage with reference to the phase of the fixed point on the waveform of the phase current of one phase detected by the current detector. However, it may be allowed that a current detector that detects a phase current for each of three phases is provided, and the control voltage generation timing arithmetical operation means is comprised so as to calculate generation timing of the AC control voltage of each phase with reference to the phase of the fixed point on the waveform of the phase current of each phase detected by the phase detection means.

When the generation timing of the AC control voltage is calculated with reference to the phase of the fixed point on the waveform of the phase current as described above, the control voltage generation timing arithmetical operation means may be comprised so as to detect the phase voltage of one phase only, and calculate the generation timing of the three-phase AC control voltage with reference to the phase of the fixed point on the waveform of the phase voltage of one phase, or the control voltage generation timing arithmetical operation means may be comprised so as to detect the phase of the fixed point on the waveform of the phase voltage of each of three phases, and calculate the generation timing of the AC control voltage of each phase with reference to the phase of the fixed point on the waveform of the phase voltage of each phase.

Also, the control voltage generation timing arithmetical operation means may be comprised so as to calculate generation timing of an AC control voltage phase of a delayed phase with reference to a phase of a fixed point on a waveform of a phase voltage of an advanced phase.

In the above description, the magneto generator having the three-phase armature winding is used as an example, but the present invention may be applied to the case of using a magneto generator having an n-phase (n is an integer equal to or larger than one) armature winding.

In the above description, the battery is connected between the DC terminals of the inverter as the voltage accumulation means, and the battery is charged with the rectified output of the magneto generator as an example, but the present invention may be applied to the case where a capacitor is connected between the DC terminals of the inverter as the voltage accumulation means, and a load is connected across the capacitor.

Also, the present invention may be applied to an inverter generator in which a first inverter is provided between an output terminal of a magneto generator and a capacitor as voltage accumulation means, an AC output of the magneto generator is rectified through a rectifier circuit comprised of feedback diodes in the first inverter and applied to the capacitor, the voltage across the capacitor is applied between DC terminals of a second inverter, and a voltage across the capacitor is converted into an AC voltage having a certain frequency (for example, a commercial frequency) by the second inverter. In this case, vector control is performed by applying an AC control voltage having a predetermined phase angle in relation to a reference phase to an armature winding of the magneto generator through the first inverter with the voltage across the capacitor connected between the DC terminals of the first inverter.

Although the preferred embodiments of the invention has been described and illustrated with reference to the accompanying drawings, it will be understood by those skilled in the art that these are by way of examples, and that various changes and modifications may be made without departing from the spirit and scope of the invention, which is defined only to the appended claims.

What is claimed is:

1. A generation device comprising:
a magneto generator including a rotor having a magnetic field and a stator having an n-phase (n is an integer equal to or larger than one) armature winding;
an n-phase voltage type inverter including n-phase bridge-connected switch elements and feedback diodes connected in anti-parallel with the switch elements, and having an AC terminal connected to an output terminal of said armature winding and DC terminals between which voltage accumulation means and a load are connected in parallel; and
a controller that controls said inverter so as to apply an n-phase AC control voltage having the same output voltage and frequency as said magneto generator and having a predetermined phase angle in relation to a preset reference phase from said voltage accumulation means to said armature winding through said inverter to perform control to maintain a voltage across said voltage accumulation means at a limit value or less,
wherein said generation device further comprises a current detector that detects a phase current of said magneto generator, and
said controller comprises:
fixed point detection means for detecting a fixed point on a waveform of said phase current;
phase current phase detection means for detecting a phase angle of the fixed point on the waveform of the phase current detected by said fixed point detection means in relation to said reference phase;
control voltage generation timing arithmetical operation means for arithmetically operating timing for generating said AC control voltage with reference to the phase of the fixed point on the waveform of the phase current detected by said phase current phase detection means; and inverter control means for controlling the switch elements of said inverter so as to generate said AC control voltage at the timing arithmetically operated by said control voltage generation timing arithmetical operation means.

2. The generation device according to claim 1, further comprising:

a voltage detector that detects the voltage across said voltage accumulation means; and a temperature sensor that detects a temperature of the armature winding of said magneto generator, wherein said phase current phase detection means comprises:

rotational speed arithmetical operation means for arithmetically operating a rotational speed of said magneto generator from a cycle of detection of the fixed point on the waveform of the phase current by said fixed point detection means;

phase current phase arithmetical operation means for searching a phase current phase arithmetical operation map that provides a relationship between the level of said phase current, the rotational speed of said magneto generator, and the phase angle of the fixed point on the waveform of said phase current in relation to said reference phase, with respect to the level of the phase current detected by said current detector and the rotational speed arithmetically operated by said rotational speed arithmetical operation means to arithmetically operate the phase angle of the fixed point on the waveform of said phase current in relation to said reference phase; and phase current phase correction means for correcting the phase angle arithmetically operated by said phase current phase arithmetical operation means with respect to the voltage across said voltage accumulation means detected by said voltage detector and the temperature of the armature winding detected by said temperature sensor.

3. The generation device according to claim 1, wherein the fixed point on the waveform of said phase current is any of a zero cross point in shift of the phase current waveform from a positive half wave to a negative half wave, a zero cross point in shift of the phase current waveform from the negative half wave to the positive half wave, a peak point of the positive half wave or the negative half wave of the phase current waveform, or a point where the positive half wave or the negative half wave of the phase current reaches a set threshold value.

4. The generation device according to claim 1, wherein said reference phase is a phase of a no-load induced voltage of said armature winding.

5. The generation device according to claim 1, wherein said phase current phase detection means is comprised so as to detect a phase of a fixed point on a waveform of a phase current of one phase only, and said control voltage generation timing arithmetical operation means is comprised so as to calculate generation timing of an n-phase AC control voltage with reference to the phase of the fixed point on the waveform of the phase current of one phase detected by said phase current phase detection means.

6. The generation device according to claim 2, wherein said phase current phase arithmetical operation map is prepared by using a relationship between a phase angle of an AC control voltage to be applied to the armature winding for passing a phase current having the same level as the phase current that passes through said armature winding without the AC control voltage being applied to said armature winding, the rotational speed of said magneto generator, and the level of said phase current, and a relationship between the phase angle of the voltage across each phase winding of the armature winding to which said AC control voltage is applied and the phase angle of the phase current.

7. A generation device comprising:

a magneto generator including a rotor having a magnetic field and a stator having an n-phase (n is an integer equal to or larger than one) armature winding;

an n-phase voltage type inverter including n-phase bridge-connected switch elements and feedback diodes connected in anti-parallel with the switch elements, and having an AC terminal connected to an output terminal of said armature winding and DC terminals between which voltage accumulation means and a load are connected in parallel; and a controller that controls said inverter so as to apply an n-phase AC control voltage having the same output voltage and frequency as said magneto generator and having a predetermined phase angle in relation to a preset reference phase from said voltage accumulation means to said armature winding through said inverter to perform control to maintain a voltage across said voltage accumulation means at a limit value or less, wherein said generation device further comprises:

a current detector that detects a phase current of said magneto generator;

a voltage detector that detects the voltage across said voltage accumulation means; and a temperature sensor that detects a temperature of the armature winding of said magneto generator, and said controller comprises:

fixed point detection means for detecting a fixed point on a waveform of said phase current that appears every lapse of a time period corresponding to a half cycle of the waveform of said phase current;

rotational speed arithmetical operation means for arithmetically operating a rotational speed of said magneto generator from a cycle of detection of the fixed point by said fixed point detection means;

first phase current phase arithmetical operation means for using one of two fixed points detected in a time period corresponding to one cycle of the waveform of said phase current as a specific fixed point, and arithmetically operating a phase angle in relation to said reference phase of said specific fixed point, with respect to the rotational speed arithmetically operated by said rotational speed arithmetical operation means and the level of the phase current detected by said current detector;

first phase current phase correction means for correcting the phase angle arithmetically operated by said first phase current phase arithmetical operation means with respect to the voltage across said voltage accumulation means detected by said voltage detector and the temperature of the armature winding detected by said temperature sensor;

first control voltage generation timing arithmetical operation means for arithmetically operating timing for generating said AC control voltage with reference to the phase of the specific fixed point on the waveform of the phase current corrected by said first phase current phase correction means;

second phase current phase detection means for detecting the phase of the specific fixed point on the waveform of said phase current that appears after the generation timing of said AC control voltage with reference to the generation timing of said AC control voltage;

second phase current phase correction means for correcting the phase of the fixed point on the waveform of the phase current detected by said second phase current phase detection means with respect to the rotational speed arithmetically operated by said rotational speed arithmetical operation means, the voltage detected by said voltage detector, and the temperature detected by said temperature sensor;

second control voltage generation timing arithmetical operation means for arithmetically operating the generation timing of the AC control voltage with reference to the phase of the fixed point on the waveform of the phase current corrected by said second phase current phase correction means; and inverter control means for controlling the switch elements of said inverter so as to generate the AC control voltage at the timing arithmetically operated by said first control voltage generation timing arithmetical operation means when the AC control voltage is first generated after the voltage across said voltage accumulation means exceeds the limit value, and generate said AC control voltage at the timing arithmetically operated by said second control voltage generation timing arithmetical operation means when the AC control voltage is generated for the second time or thereafter after the voltage across said voltage accumulation means exceeds the limit value.

8. The generation device according to claim 7, wherein the fixed point on the waveform of said phase current is any of a zero cross point in shift of the phase current waveform from a positive half wave to a negative half wave, a zero cross point in shift of the phase current waveform from the negative half wave to the positive half wave, a peak point of the positive half wave or the negative half wave of the phase current waveform, or a point where the positive half wave or the negative half wave of the phase current reaches a set threshold value.

9. The generation device according to claim 7, wherein said reference phase is a phase of a no-load induced voltage of said armature winding.

10. The generation device according to claim 7, wherein said phase current phase detection means is comprised so as to detect a phase of a fixed point on a waveform of a phase current of one phase only, and said control voltage generation timing arithmetical operation means is comprised so as to calculate generation timing of an n-phase AC control voltage with reference to the phase of the fixed point on the waveform of the phase current of one phase detected by said phase current phase detection means.

11. A generation device comprising:

a magneto generator including a rotor having a magnetic field and a stator having an n-phase (n is an integer equal to or larger than one) armature winding;

an n-phase voltage type inverter including n-phase bridge-connected switch elements and feedback diodes connected in anti-parallel with the switch elements, and having an AC terminal connected to an output terminal of said armature winding and DC terminals between which voltage accumulation means and a load are connected in parallel; and a controller that controls said inverter so as to apply an n-phase AC control voltage having the same output voltage and frequency as said magneto generator and having a predetermined phase angle in relation to a preset reference phase from said voltage accumulation means to said armature winding through said inverter to perform control to maintain a voltage across said voltage accumulation means at a limit value or less, wherein said generation device further comprises:

a current detector that detects a phase current of said magneto generator;

a voltage detector that detects the voltage across said voltage accumulation means; and a temperature sensor that detects a temperature of the armature winding of said magneto generator, and said controller comprises:

fixed point detection means for detecting a fixed point on a waveform of said phase current that appears every lapse of a time period corresponding to a half cycle of the waveform of said phase current;

rotational speed arithmetical operation means for arithmetically operating a rotational speed of said magneto generator from a cycle of detection of the fixed point by said fixed point detection means;

first phase current phase arithmetical operation means for using one of two fixed points detected in a time period corresponding to one cycle of the waveform of said phase current as a specific fixed point, and arithmetically operating a phase angle of said specific fixed point in relation to said reference phase, with respect to the rotational speed arithmetically operated by said rotational speed arithmetical operation means and the level of the phase current detected by said current detector;

first phase current phase correction means for correcting the phase angle arithmetically operated by said first phase current phase arithmetical operation means with respect to the voltage across said voltage accumulation means detected by said voltage detector and the temperature of the armature winding detected by said temperature sensor;

first control voltage generation timing arithmetical operation means for arithmetically operating timing for generating said AC control voltage with reference to the phase of the specific fixed point on the waveform of the phase current corrected by said first phase current phase correction means;

second control voltage generation timing arithmetical operation means for arithmetically operating generation timing of a next generated AC control voltage with reference to the generation timing of said AC control voltage; and inverter control means for controlling the switch elements of said inverter so as to generate the AC control voltage at the timing arithmetically operated by said first control voltage generation timing arithmetical operation means when the AC control voltage is first generated after the voltage across said voltage accumulation means exceeds the limit value, and generate said AC control voltage at the timing arithmetically operated by said second control voltage generation timing arithmetical operation means when the AC control voltage is generated for the second time or thereafter after the voltage across said voltage accumulation means exceeds the limit value.

12. The generation device according to claim 11, wherein the fixed point on the waveform of said phase current is any of a zero cross point in shift of the phase current waveform from a positive half wave to a negative half wave, a zero cross point in shift of the phase current waveform from the negative half wave to the positive half wave, a peak point of the positive half wave or the negative half wave of the phase current waveform, or a point where the positive half wave or the negative half wave of the phase current reaches a set threshold value.

13. The generation device according to claim 11, wherein said reference phase is a phase of a no-load induced voltage of said armature winding.

14. The generation device according to claim 11, wherein said phase current phase detection means is comprised so as to detect a phase of a fixed point on a waveform of a phase current of one phase only, and said control voltage generation timing arithmetical operation means is comprised so as to calculate generation timing of an n-phase AC control voltage with reference to the phase of the fixed point on the waveform of the phase current of one phase detected by said phase current phase detection means.

15. A generation device comprising:

a magneto generator including a rotor having a magnetic field and a stator having an n-phase (n is an integer equal to or larger than one) armature winding;

an n-phase voltage type inverter including n-phase bridge-connected switch elements and feedback diodes connected in anti-parallel with the switch elements, and having an AC terminal connected to an output terminal of said armature winding and DC terminals between which voltage accumulation means and a load are connected in parallel; and a controller that controls said inverter so as to apply an n-phase AC control voltage having the same output voltage and frequency as said magneto generator and having a predetermined phase angle in relation to a preset reference phase from said voltage accumulation means to said armature winding through said inverter to perform control to maintain a voltage across said voltage accumulation means at a limit value or less, wherein said generation device further comprises:

a current detector that detects a phase current of said magneto generator; and a voltage detector that detects a voltage across each phase winding of said magneto generator as a phase voltage, and said controller comprises:

fixed point detection means for detecting a fixed point on a waveform of said phase voltage;

rotational speed arithmetical operation means for arithmetically operating a rotational speed of said magneto generator from a cycle of detection of the fixed point on the waveform of the phase voltage by said fixed point detection means;

phase voltage phase arithmetical operation means for searching a phase voltage phase arithmetical operation map that provides a relationship between the level of said phase current, the rotational speed of said magneto generator, and a phase angle of the fixed point on the waveform of said phase voltage in relation to said reference phase, with respect to the level of the phase current detected by said current detector and the rotational speed arithmetically operated by said rotational speed arithmetical operation means to arithmetically operate the phase angle of said phase voltage in relation to said reference phase;

control voltage generation timing arithmetical operation means for arithmetically operating timing for generating said AC control voltage with reference to the phase of the fixed point of the phase voltage arithmetically operated by said phase voltage phase arithmetical operation means; and inverter control means for controlling the switch elements of said inverter so as to generate said AC control voltage at the timing arithmetically operated by said control voltage generation timing arithmetical operation means.

16. The generation device according to claim 15, wherein the fixed point on the waveform of the phase voltage is any of a zero cross point in shift of the phase voltage waveform from a positive half wave to a negative half wave, a zero cross point in shift of the phase voltage waveform from the negative half wave to the positive half wave, a peak point of the positive half wave or the negative half wave of the phase voltage waveform, or a point at which the positive half wave or the negative half wave of the phase voltage reaches a set threshold value.

17. The generation device according to claim 15, wherein said reference phase is a phase of a no-load induced voltage of said armature winding.

18. The generation device according to claim 15, wherein said phase voltage phase detection means is comprised so as to detect a phase of a phase voltage of one phase only, and said control voltage generation timing arithmetical operation means is comprised so as to calculate generation timing of an n-phase AC control voltage with reference to the phase of the phase voltage of one phase detected by said phase voltage phase detection means.

19. The generation device according to claim 15, wherein said phase voltage phase arithmetical operation map is prepared by using a relationship between a phase angle of an AC control voltage to be applied to the armature winding for passing a phase current having the same level as the phase current that passes through said armature winding without the AC control voltage being applied to said armature winding, the rotational speed of said magneto generator, and the level of said phase current.

\* \* \* \* \*

UNITED STATES PATENT AND TRADEMARK OFFICE
CERTIFICATE OF CORRECTION

PATENT NO. : 7,683,587 B2
APPLICATION NO. : 11/846700
DATED : March 23, 2010
INVENTOR(S) : Inaba et al.

It is certified that error appears in the above-identified patent and that said Letters Patent is hereby corrected as shown below:

In column 5, line 67, please delete the ":" after the word "angle" and before the word "of", In column 10, line 34, please replace the word "MOSSFT" with the word --MOSFET--, In column 11, line 31, please replace "8'" with the number --8-- after the word "detector" and before the word "is", In column 12, line 30, please replace the word "AG" with the letters --AC-- after the word "generated" and before the word "control", In column 14, line 8, please delete the "%" after the word "the" and before the word "armature", In column 17, line 53, please replace "N14" with --N1-- after the word "is" and before the word "in", In column 23, line 67, please replace "S345" with --S315-- after the word "Step" and before the second ",".

Signed and Sealed this

Twenty-second Day of June, 2010

David J. Kappos
*Director of the United States Patent and Trademark Office*